United States Patent [19]

Thompson et al.

[11] Patent Number: 5,483,055
[45] Date of Patent: Jan. 9, 1996

[54] METHOD AND APPARATUS FOR PERFORMING AN AUTOMATIC FOCUS OPERATION FOR A MICROSCOPE

[76] Inventors: Timothy V. Thompson, 1220 N. Bascom Ave., #8, San Jose, Calif. 95128; Christopher R. Fairlay, 809 Harding Ave., San Jose, Calif. 95126; Ken K. Lee, 1326 Morton Ave., Los Altos, Calif. 94024

[21] Appl. No.: 183,536

[22] Filed: Jan. 18, 1994

[51] Int. Cl.[6] ....................................................... G01J 1/20
[52] U.S. Cl. ............................... 250/201.3; 359/368
[58] Field of Search .......................... 250/201.2, 201.3, 250/204, 216; 359/368, 381, 371

[56] References Cited

U.S. PATENT DOCUMENTS

| | | | |
|---|---|---|---|
| 4,342,905 | 8/1982 | Fujii et al. | 250/201.3 |
| 4,844,617 | 7/1989 | Kelderman et al. | 356/372 |
| 5,122,648 | 6/1992 | Cohen et al. | 359/371 |
| 5,306,902 | 4/1994 | Goodman | 359/368 |

*Primary Examiner*—Stephone B. Allen
*Attorney, Agent, or Firm*—Skjerven, Morrill, MacPherson, Franklin & Friel; Alan H. MacPherson; E. Eric Hoffman

[57] ABSTRACT

A method for quickly performing an auto-focus operation on a confocal microscope. As a coarse Z-stage moves a target toward an objective lens, a photodetector generates an analog electronic focus signal which exceeds a threshold level during a focused condition. When a focused condition exists, a latching comparator, which is coupled to the electronic focus signal and to a signal representative of the threshold level, trips and the target is stopped. The analog nature of the electronic focus signal assures that the focused condition will be detected. As a result, the target may be moved quickly without missing a focused condition. The target is moved several times at progressively slower velocities to position the target close to the focus position. In another embodiment of the present invention, an auto focus operation is performed by positioning the target such that a focus position is within the range of motion of the target, moving the target a plurality of first steps through its range of motion, and measuring the strength of a focus signal at each first step. The target is sequentially moved a multiplicity of second steps through a second range of motion on either side of the first step at which the maximum strength was measured. The strength of the focus signal is measured at each of these second steps. The target is moved to the second step at which the maximum strength was measured.

23 Claims, 22 Drawing Sheets

5,483,055

METHOD AND APPARATUS FOR PERFORMING AN AUTOMATIC FOCUS OPERATION FOR A MICROSCOPE

CROSS-REFERENCE TO RELATED APPLICATIONS

This application is related to and incorporates by reference commonly owned U.S. patent application Ser. No. 08/080,014, entitled "Laser Imaging System for Inspection and Analysis of Sub-Micron Particles", filed by Bruce W. Worster et al, on Jun. 17, 1993.

NOTICE OF COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to a method and apparatus for performing an automatic focusing operation. More particularly, the present invention relates to the automatic focusing of a confocal laser microscope.

BACKGROUND OF THE INVENTION

In certain prior art auto-focusing microscopes, a light source is used to transmit light to a spot on the object to be viewed (target). The light is reflected from the surface of the target to a photodetector which senses the intensity of the reflected light. An electronic focus signal, which is proportional to the intensity of the reflected light, is generated by the photodetector. This electronic focus signal reaches a maximum (or minimum) when the target is in focus. The electronic focus signal is used to control the auto-focus operation.

In other auto-focus microscopes a white light camera is used to detect a maximum contrast in the camera picture to indicate when the target is in focus. Measuring the picture contrast requires a large amount of computer processing. This method is therefore slow and complicated. Additionally, this method fails if the target has no contrast (i.e., if the target is flat and has a uniform color, or is mirror-like).

Speed is one desirable characteristic of an auto-focus system. A larger period of time required to perform an auto-focus operation reduces the number of targets which can be viewed in a given time period, or, equivalently, increases the amount of time required to view a given number of targets, and thereby increases the cost associated with viewing each sample.

Accuracy and repeatability are other desirable characteristics of an auto-focus system. Certain prior art auto-focusing microscopes rely on a single point within the viewing area on the target to provide focusing information. In such microscopes, local height variations in the surface of the target can cause the focused condition to be less than optimal within the viewing area if the point at which focusing is performed is significantly higher or lower than the remainder of the viewing area. Certain other prior art auto-focusing microscopes utilize auto-focus optics which are separate from the imaging optics of the microscope. In such microscopes, any "drift" between the auto-focus optics and the imaging optics will result in decreased auto-focusing accuracy.

It is therefore desirable to have an auto-focus system which can perform auto-focus operations quickly, reliably and accurately.

SUMMARY OF THE INVENTION

Accordingly, the present invention provides a method and apparatus for performing an accurate, reliable, high-speed auto-focus operation. The method and apparatus are not subject to "drift" because the imaging optics are also used to obtain information used in the auto-focus operation.

In one embodiment of the present invention, an auto-focus operation is performed by continuously moving a target through a first distance relative to an objective lens of a microscope. The relative movement occurs as a result of moving either the objective lens or the target. An electronic focus signal is continuously generated during the relative movement. The absolute value of the electronic focus signal is continuously compared to a threshold value and the movement of the target is stopped when the absolute value of the electronic focus signal exceeds the threshold value.

Because there is a certain amount of overshoot associated with stopping the relative motion between the target and the objective lens, several successive iterations can be performed to position the target closer to the focus position.

In another embodiment of the present invention, the target is positioned such that a focus position is within the range of motion of the target by first performing a coarse auto-focus operation. The target is moved a plurality of steps through the range of motion of the target and the magnitude of the electronic focus signal is measured at each step. The target is then moved a multiplicity of steps through a second range of motion that is chosen to include the location in the first range of motion at which the maximum absolute value of the electronic focus signal occurred. The magnitude of the electronic focus signal is measured at each of the steps in the second range of motion. The target is moved to the location at which the maximum absolute value of the electronic focus signal in the second range of motion was measured.

The method and apparatus according to the invention allow fast, repeatable and accurate auto-focusing of a microscope. The invention will be more fully understood in light of the following drawings taken together with the detailed description.

DETAILED DESCRIPTION

Figure 1:
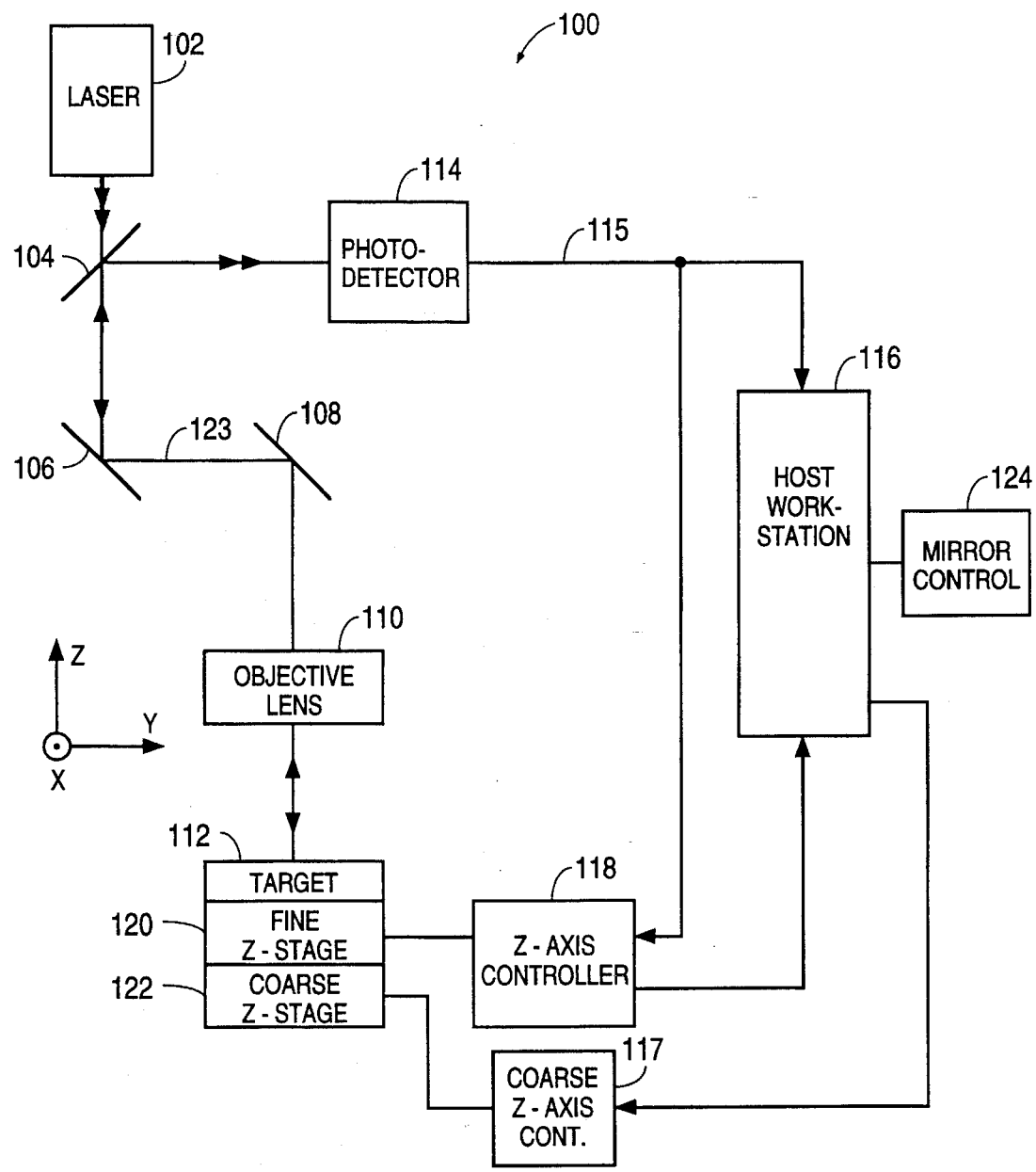
FIG. 1 is a simplified block diagram of a confocal microscope system according to an embodiment of the invention.

FIG. 1 is a simplified block diagram of a confocal microscope system 100 according to an embodiment of the invention. A confocal microscope system with which the method according to the invention can be used is described in more detail in commonly owned U.S. patent application, Ser. No. 08/080,014, entitled "Laser Imaging System for Inspection and Analysis of Sub-Micron Particles", filed by Bruce W. Worster et al, on Jun. 17, 1993, the disclosure of which is incorporated herein by reference. Laser 102 generates laser beam 123 which is transmitted through beam splitter 104, reflected from X-mirror 106 and Y-mirror 108, and transmitted through objective lens 110 to the surface of target 112. In one embodiment, laser 102 is a conventional argon-ion laser, however, other types of lasers may be utilized in alternate embodiments. Target 112 is an object, such as a semiconductor wafer, which is to be viewed using the microscope system 100. X-mirror 106 and Y-mirror 108 are each rotatable about an axis such that laser beam 123 can be moved along an X-axis and a Y-axis, respectively, of target 112. Laser 102, beam splitter 104, X-mirror 106, Y-mirror 108 and objective lens 110 are each conventional structures that are well known by those skilled in the art.

Figure 2A:
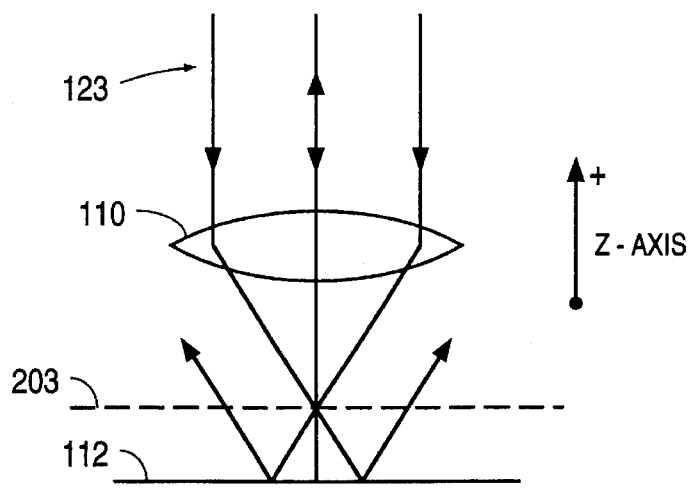
FIGS. 2a–2c show a target of a confocal microscope below the focus position, at the focus position and above the focus position, respectively, illustrating, at each position, the pattern of light reflected from the target.
Figure 2B:
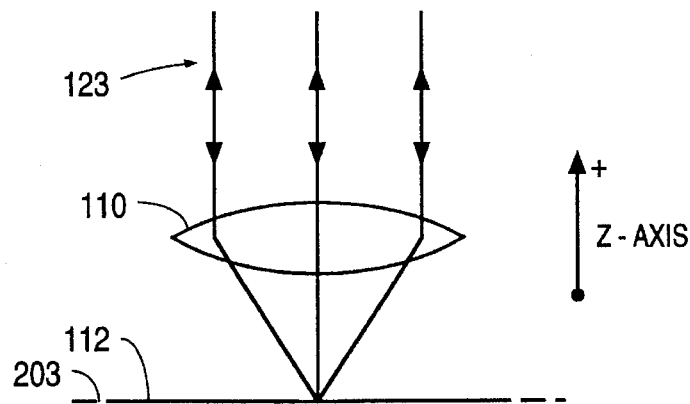
Figure 2C:
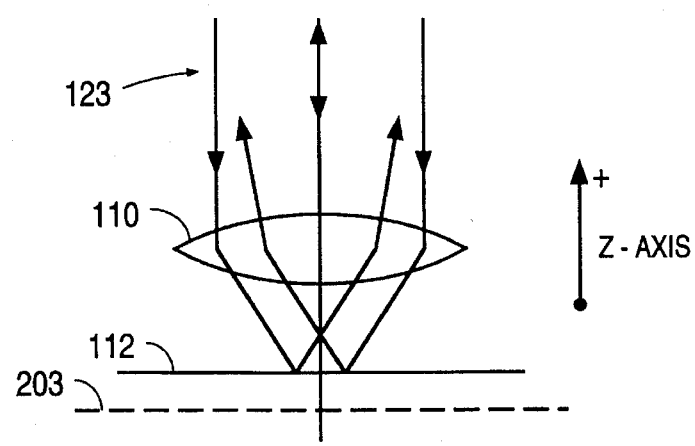

Laser beam 123 reflects from the surface of target 112 in a manner which is dependent upon the distance of objective lens 110 from target 112. FIGS. 2a–2c show target 112 below the focus position 203, at the focus position 203 and above the focus position 203, respectively, illustrating, at each position, the pattern of light reflected from target 112.

As illustrated in FIGS. 2a and 2c, when target 112 is positioned below or above the focus position 203, respectively, a small percentage of the laser light originally transmitted through objective lens 110 will be reflected back through objective lens 110 in a coherent manner. However, as shown in FIG. 2b, when target 112 is positioned at the focus position 203, substantially all of the reflected laser beam 123 is transmitted back through objective lens 110.

As shown in FIG. 1, laser beam 123 is reflected from target 112 back through objective lens 110 to Y-mirror 108, X-mirror 106 and beam splitter 104. Beam splitter 104 routes the reflected beam to a photodetector 114. Photodetector 114 is a device such as a photo-multiplier tube (PMT) or photo-diode which generates an analog electronic focus signal 115 which is proportional to the intensity of reflected laser beam 123 measured by photodetector 114. The photodetector gain must be appropriately calibrated for the laser power, laser wavelength and type of target 112 being viewed. The electronic focus signal 115 is provided to host work station 116 and to Z-axis controller 118. Z-axis controller 118 is directly coupled to fine Z-stage 120 and is indirectly coupled to coarse Z-stage 122 through host work station 116 and coarse Z-axis controller 117. Coarse Z-stage 122 uses a motor such as a stepper motor to move target 112 through a relatively large range of motion along the Z-axis. In one embodiment of the present invention, the coarse Z-stage controller 117 is a conventional stepper motor controller available as part number 310MX3 from New England Affiliated Technology and coarse Z-stage 122 is driven by a conventional stepper motor such as the Vexta C5858-9012 available from Oriental Motor. As explained in more detail below, fine Z-stage 120 uses a piezoelectrically driven element to move target 112 through a smaller range of motion along the Z-axis. Although the invention is described as having a movable target 112 and a stationary objective lens 110, it is understood that target 112 can be held stationary while objective lens 110 is moved.

Figure 3A:
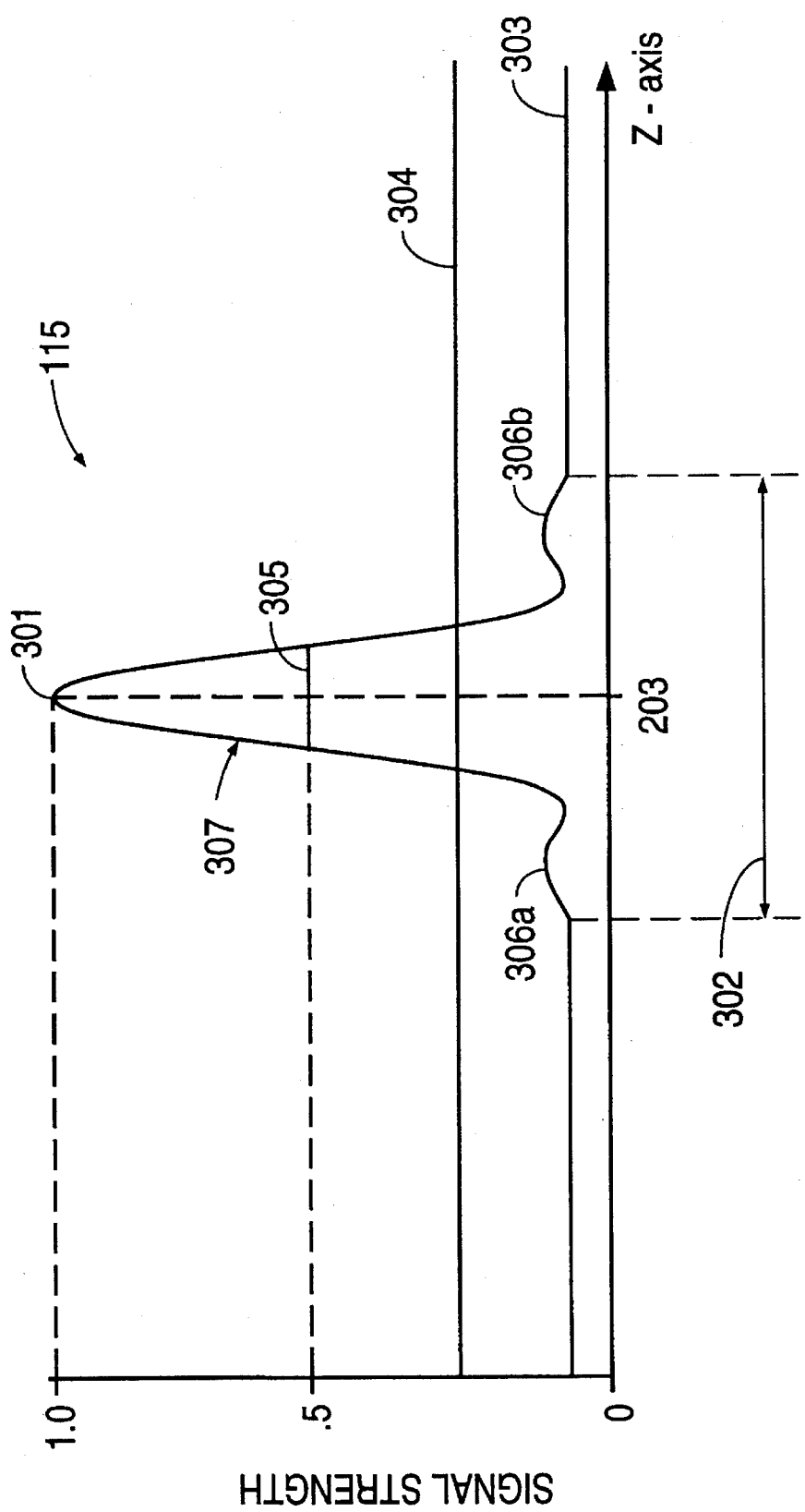
FIG. 3a is an idealized graph of an electronic focus signal of a confocal scanning laser microscope as the target is moved along the Z-axis.

FIG. 3a is an idealized graph of the electronic focus signal 115 as target 112 is moved along the Z-axis. Electronic focus signal 115 is theoretically a sine squared function $((sin(x)/x)^2)$ having a full width half max measurement 305 which varies based on the numerical aperture of the objective lens 110 and the wavelength of laser beam 123. The full width half max measurement 305 is the width of the electronic focus signal 115 (along the Z-axis) at the point at which the electronic focus signal 115 is at half of its maximum amplitude. For example, an objective lens 110 having a power of 100x and a numerical aperture of 0.95 and a laser beam 123 with a wavelength of 488 nanometers (nm) will produce an electronic focus signal 115 with a full width half max measurement of approximately 0.5 microns.

The electronic focus signal 115 exhibits a distinct focus position 203 in main lobe 307 as shown by peak 301. The electronic focus signal also exhibits two side lobes 306a–306b. The depth of focus 302 is defined by the Z-axis range at which the magnitude of the electronic focus signal 115 is greater than a background value 303. The small non-zero background value 303 of electronic focus signal 115 results from leakage currents and the small amount of background light which reaches photodetector 114. The depth of focus 302 becomes smaller as the numerical aperture of objective lens 110 increases or as the wavelength of the laser beam 123 decreases. In the following discussion, the objective lens 110 has a power of 100x and numerical aperture of 0.95, and laser beam 123 has a wavelength of 488 nm, unless otherwise noted.

Figure 3B:
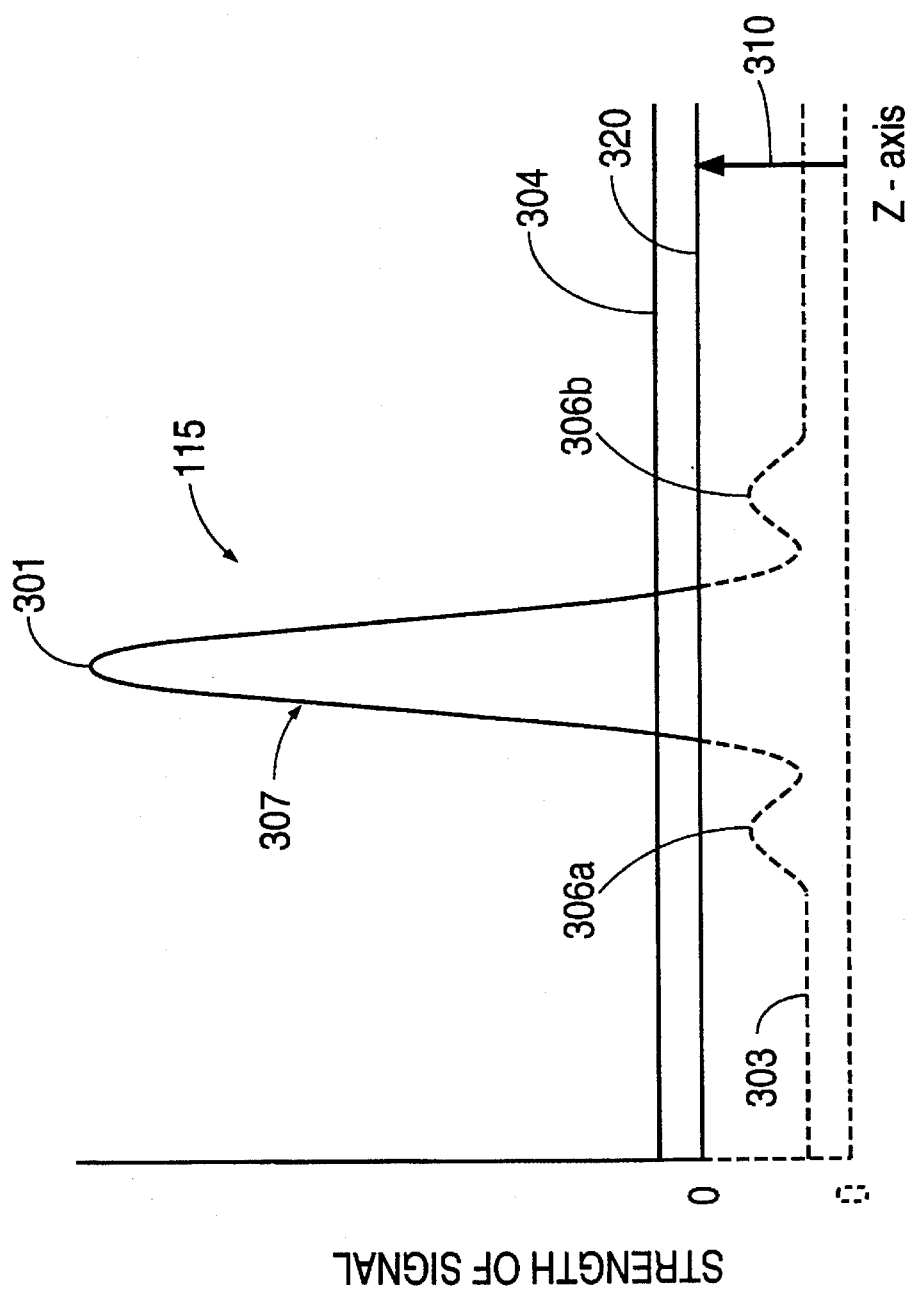
FIG. 3b is a graph illustrating an idealized electronic focus signal after the auto-focus system has been initialized.

To initialize the auto-focus system for coarse auto-focus operations, the gain of the photodetector 114 is increased and a zero position offset 310 is introduced such that the background value 303 and side lobes 306a–306b are effectively eliminated from the electronic focus signal 115. FIG. 3b is a graph illustrating the electronic focus signal 115 after the auto-focus system has been initialized. The gain of the photodetector 114 and the zero position offset 310 are empirically determined by performing a series of manual focus operations using different targets 112. The gain of the photodetector 114 is increased to increase the strength of the electronic focus signal 115. The gain is selected such that the electronic focus signal 115 has a high peak value 301 for targets 112 having a wide range of reflectivity. For example, the gain is selected such that a peak 301 is detected for an aluminum target having a high reflectivity and such that a peak 301 is also detected for a silicon dioxide target having a low reflectivity.

In addition, a zero position offset 310 is applied to the electronic focus signal 115. Zero position offset 310 is selected to ensure that the background value 303 and side lobes 306a–306b are below the adjusted zero position 320. A small positive value greater than adjusted zero position 320 is then selected for use as threshold value 304. Once the threshold value 304 has been selected, this threshold value 304 can be used for subsequent auto-focus operations on a wide variety of targets. When the value of the electronic focus signal 115 exceeds the threshold value 304, a focused condition is said to exist. During a focused condition, target 112 is relatively close to the focus position 203. The gain of the photodetector 114 and the zero position offset 310 are then maintained during the coarse auto-focus operation. Although certain photodetectors 114, particularly PMTs, can be damaged when exposed to the high signals which result from increasing the gain of photodetector 114, this is not a problem in the current invention. As discussed later, target 112 is moved through the focus condition at relatively high velocities. As a result, the photodetector 114 is not exposed to the high signal for a period of time sufficient to damage a PMT.

Figure 4:
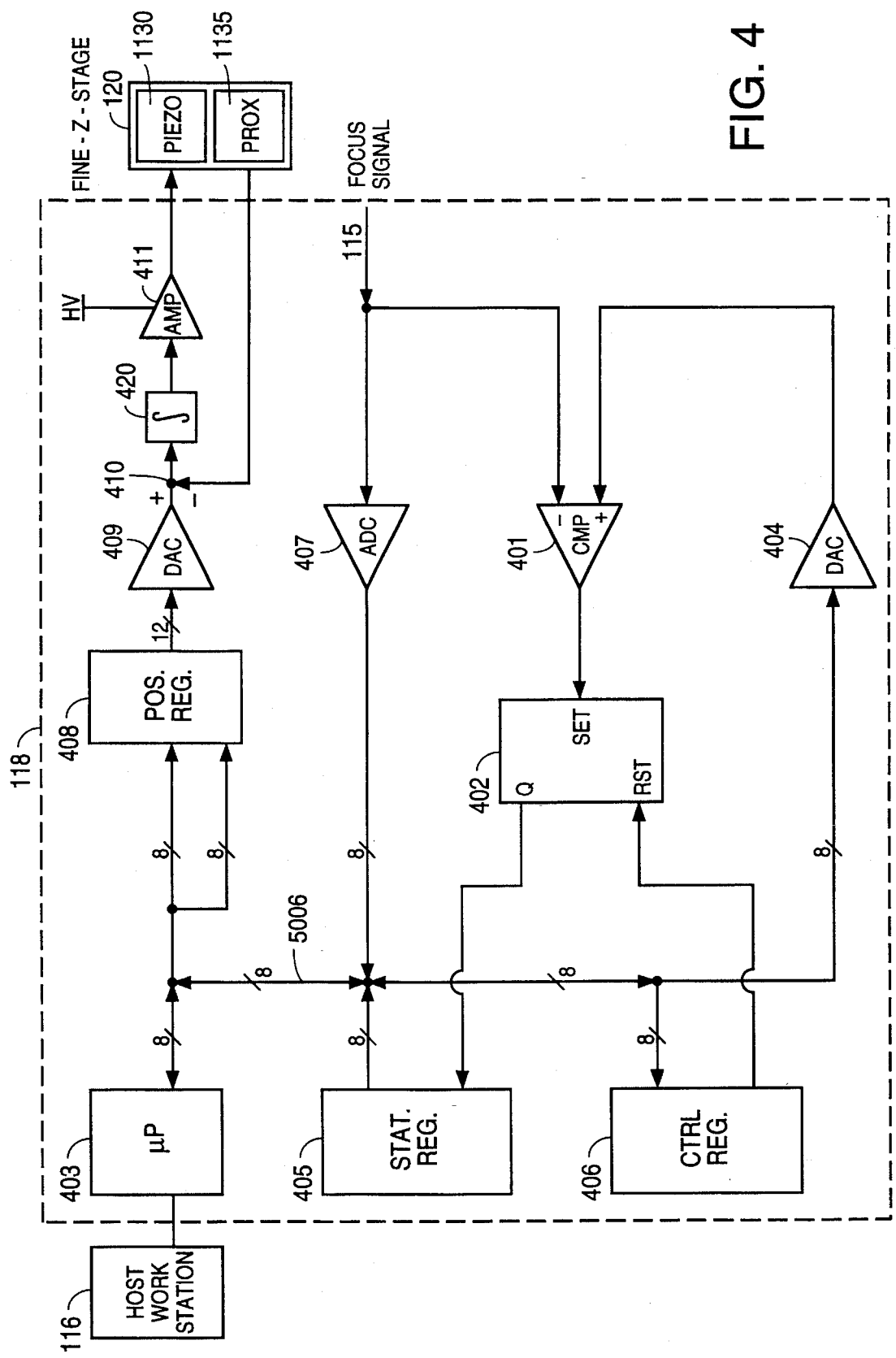
FIG. 4 is a block diagram of a Z-axis controller used to control a fine Z-stage and to provide feedback to a coarse Z-stage.

FIG. 4 is a block diagram of Z-axis controller 118 which controls the fine Z-stage 120 and also provides feedback used to control coarse Z-stage 122. Within Z-axis controller 118, the electronic focus signal 115 is transmitted to a first input terminal of comparator 401 and to an input of an analog to digital converter (ADC) 407. The output of ADC 407 is coupled to microprocessor 403. The output terminal of comparator 401 is coupled to the set terminal of latching flip flop 402. The Q output terminal of flip flop 402 is coupled to an input of status register 405. An output of control register 406 is coupled to the reset terminal of flip flop 402. The microprocessor 403 is coupled to status register 405, control register 406, digital to analog converter (DAC) 404, ADC 407 and host work station 116. The output terminal of DAC 404 is coupled to a second input terminal of comparator 401. Microprocessor 403 is also coupled to position control register 408. The output of position control register 408 is transmitted through DAC 409, integrator 420, summing node 410 and amplifier 411 to provide a control voltage to a piezoelectric element 1130 of the fine Z-stage 120. The summing node 410 also receives a feedback signal from a proximity sensor 1135 of the fine Z-stage 120. The piezoelectric element 1130 and proximity sensor 1135 of fine z-stage 120 are described in more detail below in connection with FIGS. 9–11.

Figures 1, 5A:
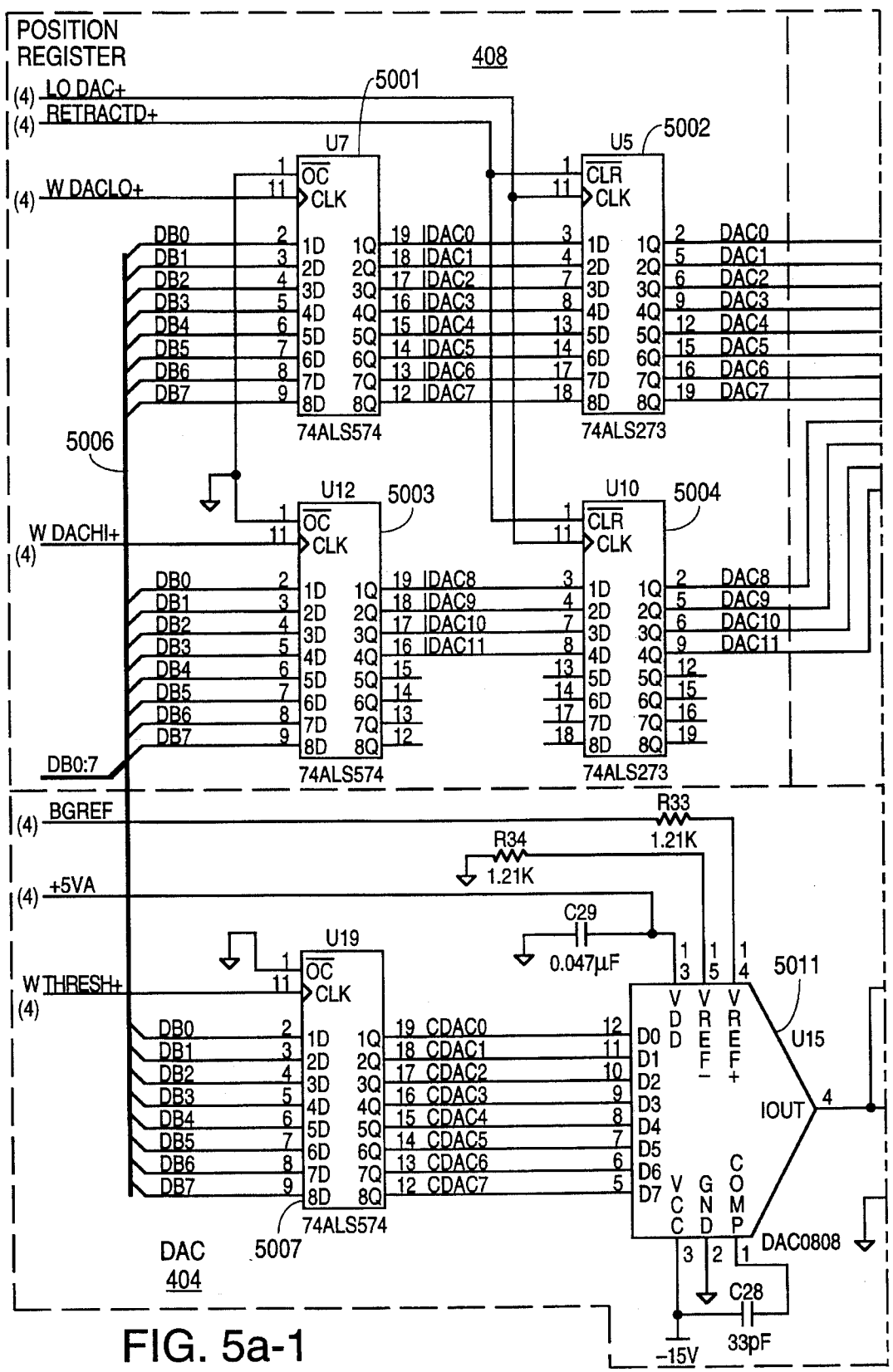
FIGS. 5a–5e are schematic diagrams of the Z-axis controller of FIG. 4.
Figures 2, 5A:
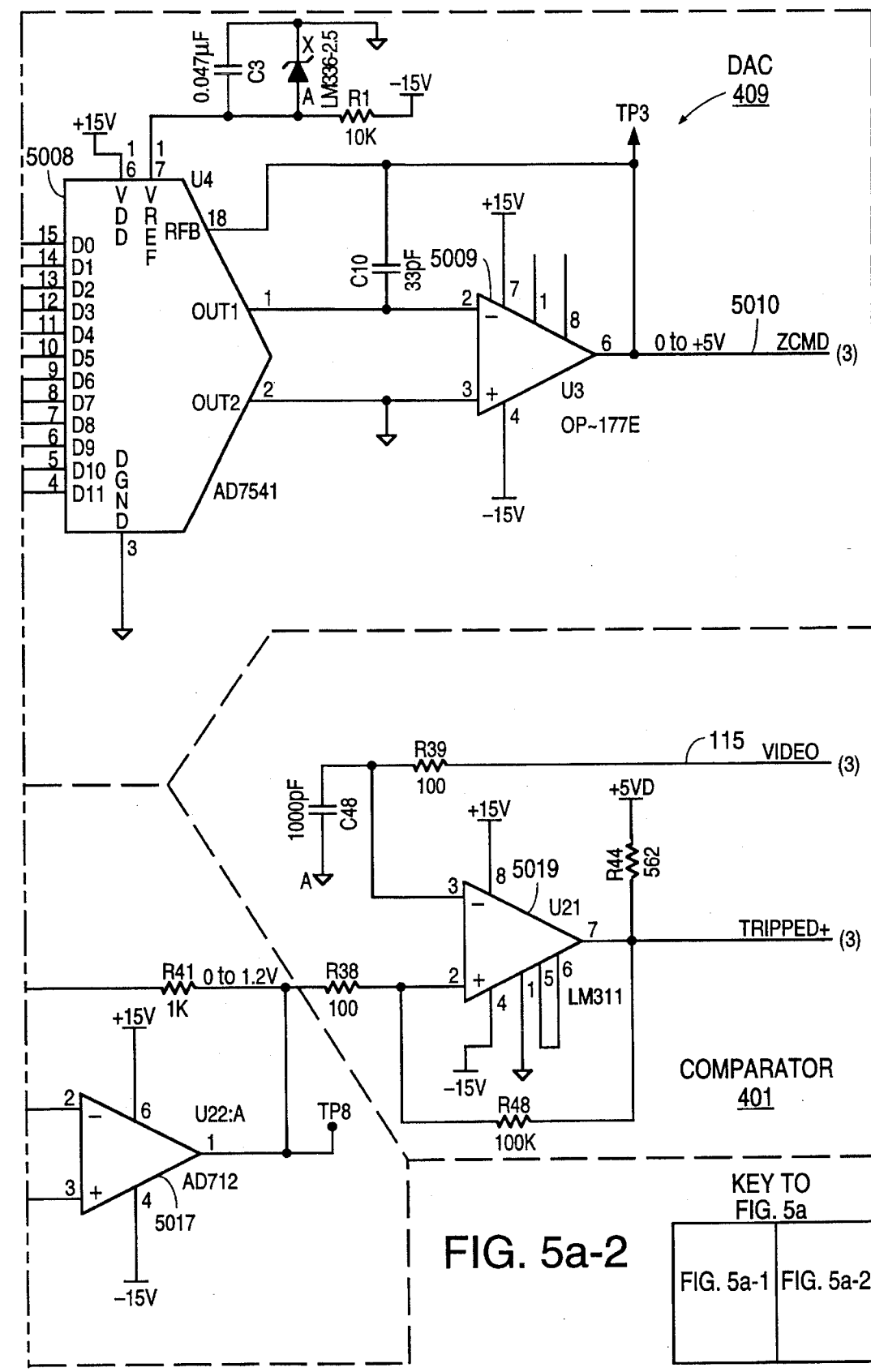
Figures 1, 5B:
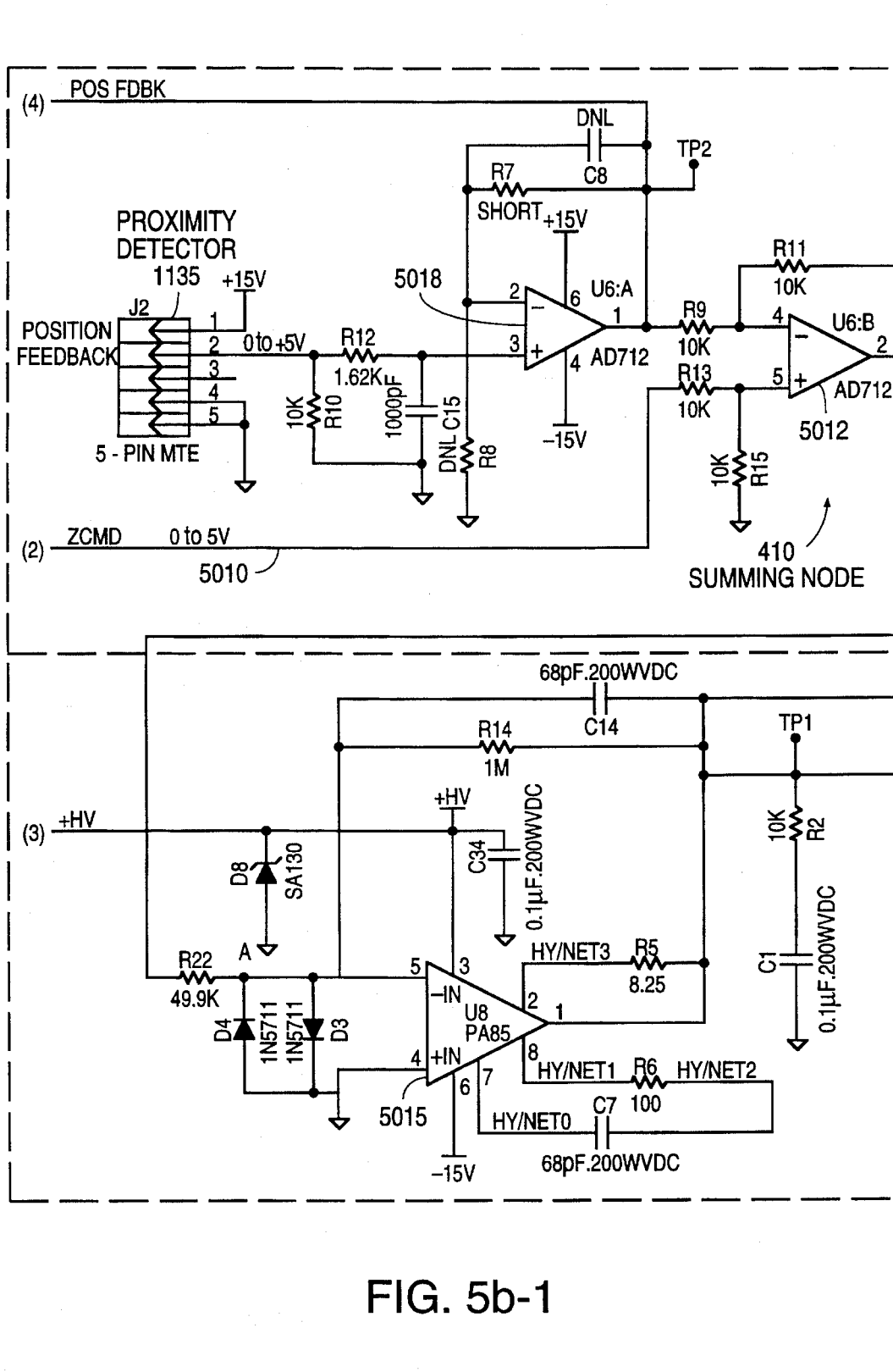
Figures 2, 5B:
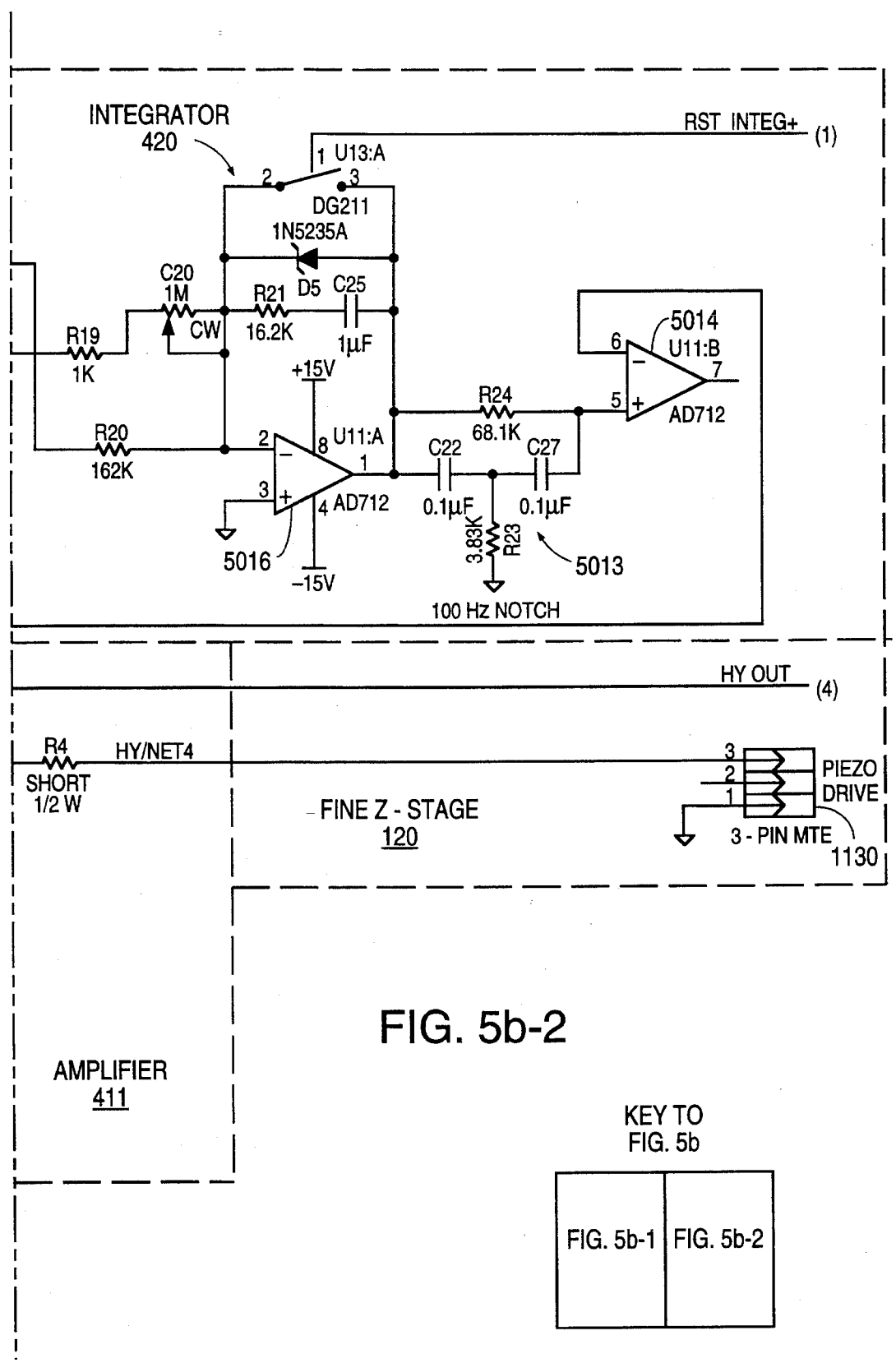
Figures 1, 5C:
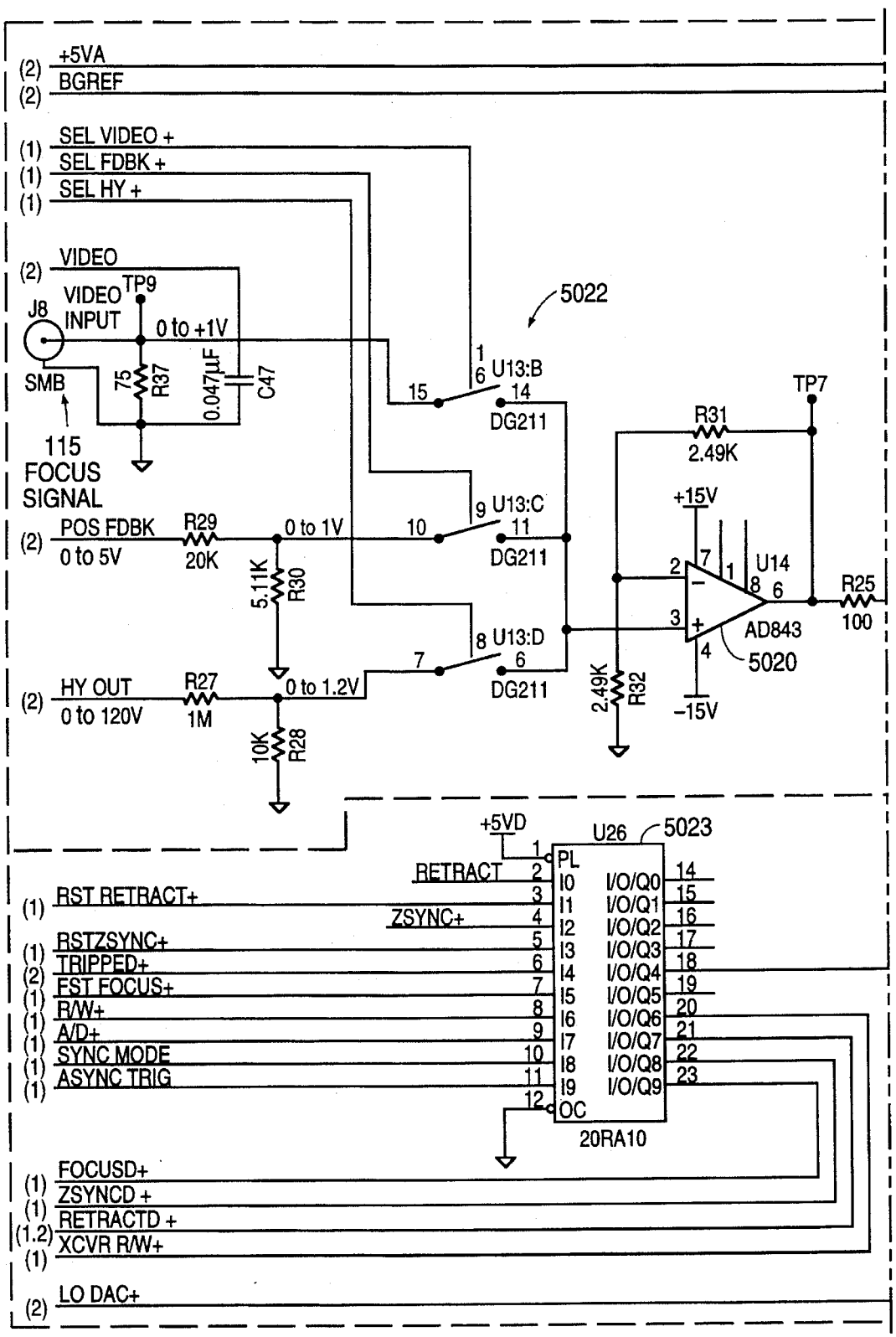
Figures 2, 5C:
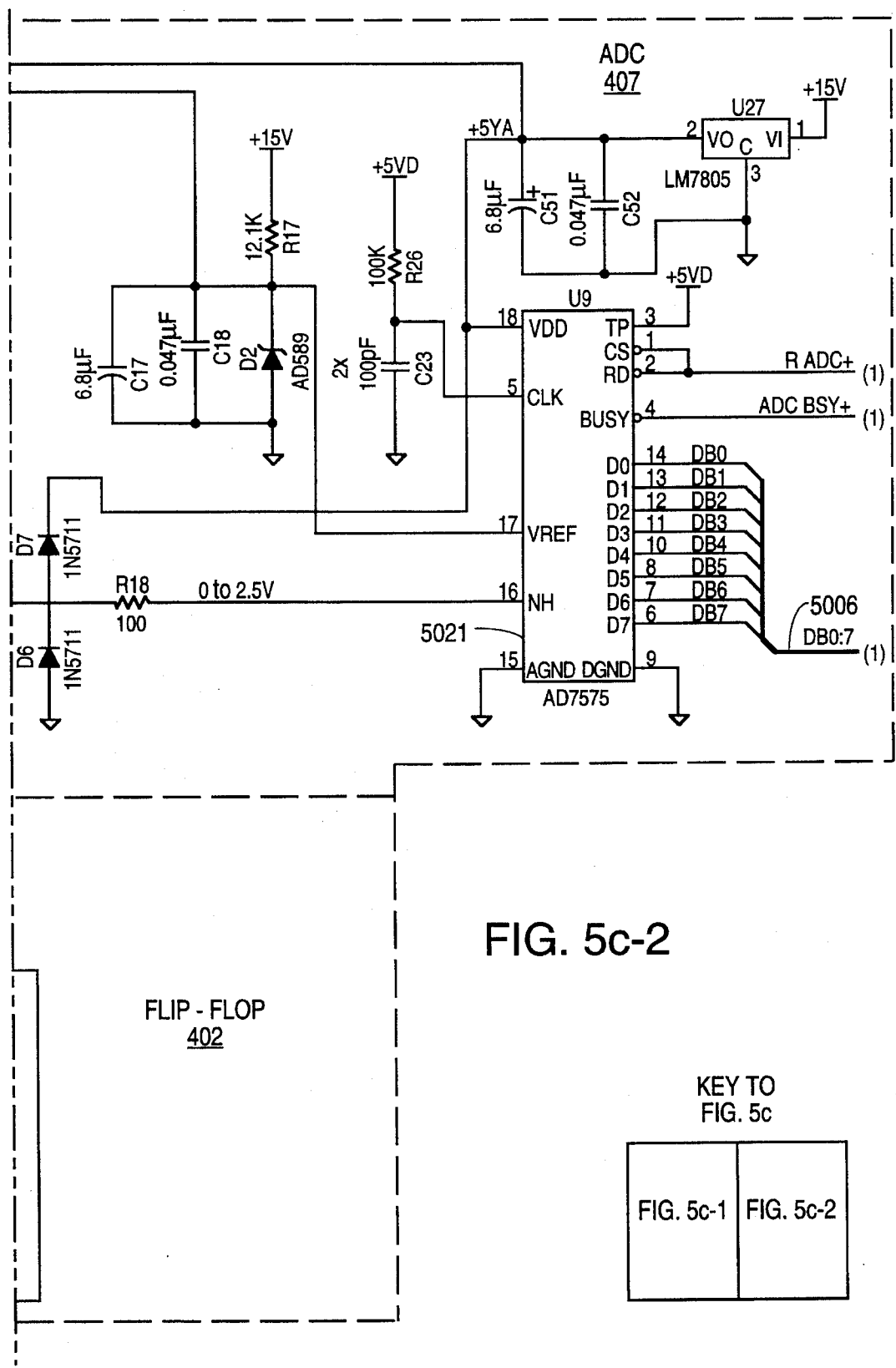
Figures 1, 5D:
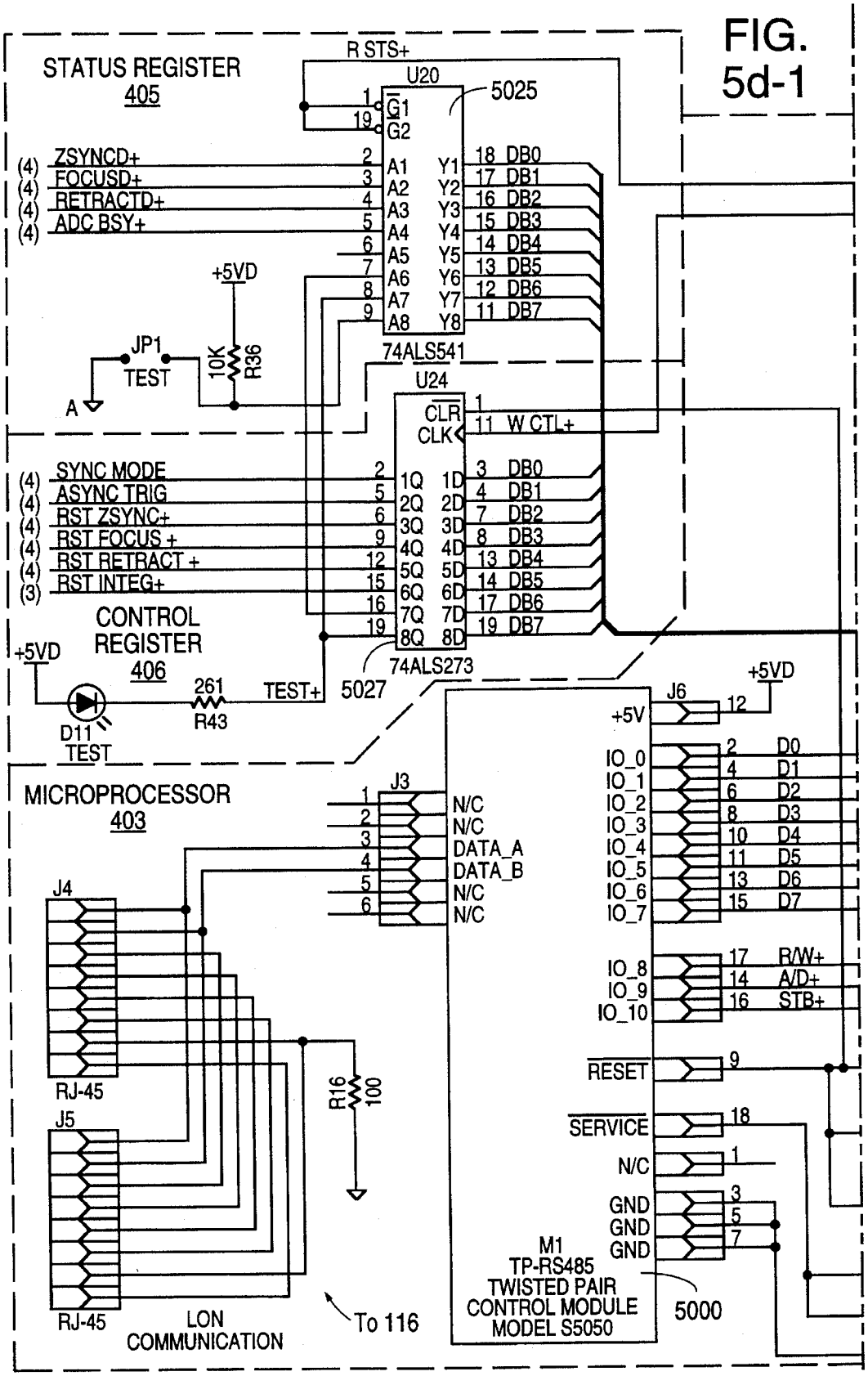
Figures 2, 5D:
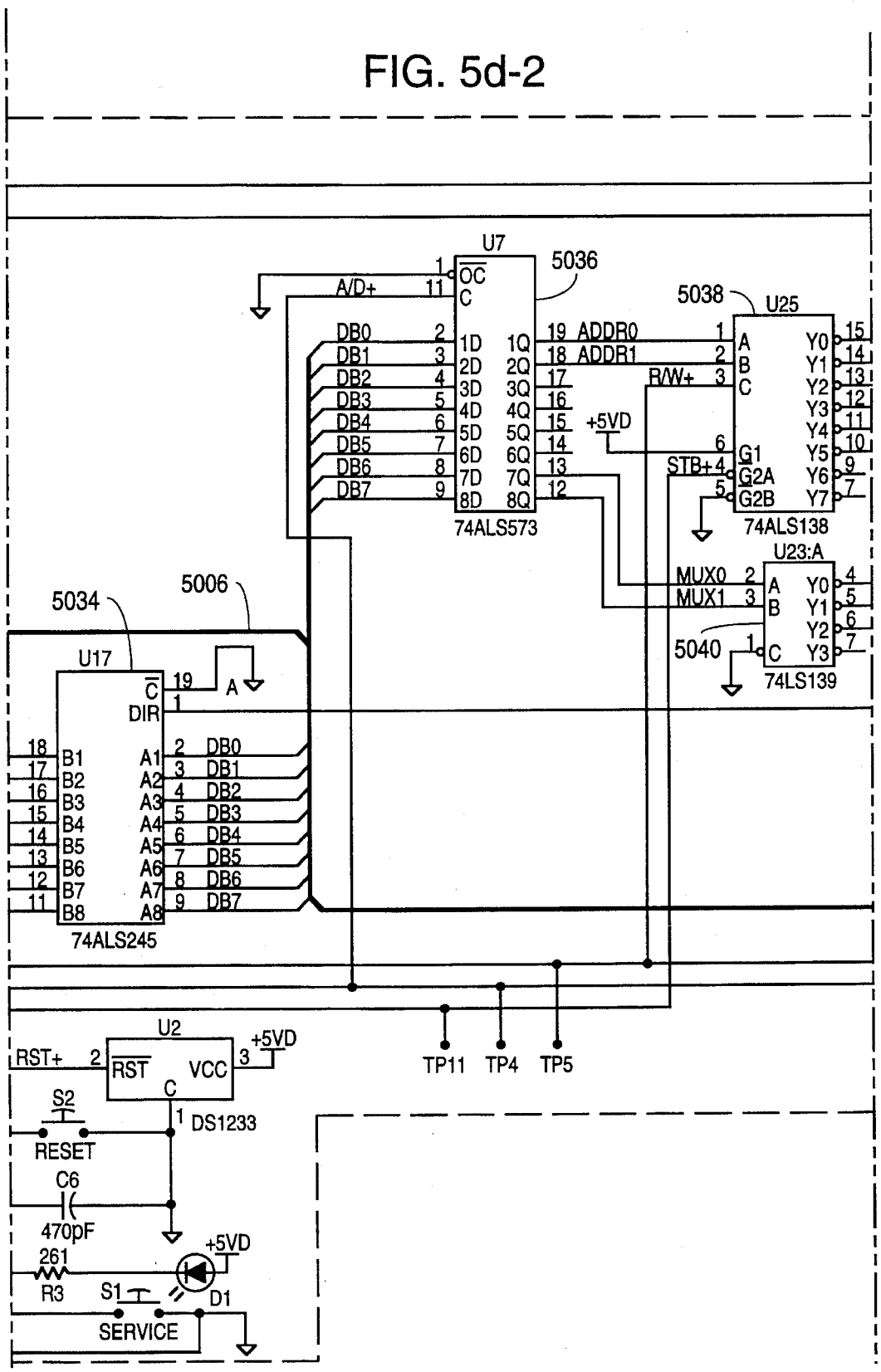
Figures 3, 5D:
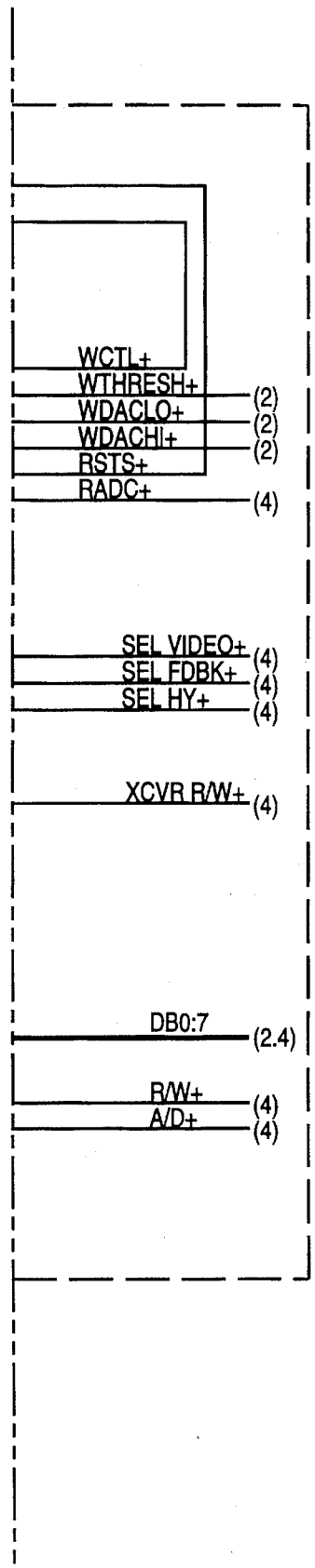

FIGS. 5a–5e are schematic diagrams of the Z-axis controller 118 of FIG. 4. Similar elements in FIGS. 4 and 5a–5e are labelled with the same number. As shown in FIG. 5d, central processing unit (CPU) 5000 of microprocessor 403 transmits and receives information through bus transceiver 5034 to 8-bit data bus 5006. CPU 5000 is a TP-RS485 twisted pair control module, model number 5505000, available from Echelon. Bus transceiver 5034 provides additional drive capability to CPU 5000. Bus transceiver 5034 is a well known device, available as part number 74ALS245, from Texas Instruments (TI). Address register 5036 receives addressing information from CPU 5000 from data bus 5006. This addressing information determines the register or device within the Z-axis controller 118 that the microprocessor 403 wishes to access. Address register 5036 is available from TI as part number 74ALS573. The output of address register 5036 is provided to address decoders 5038 and 5040. Address decoders 5038 and 5040 decode the previously described addressing information and generate signals which enable the register or device within the Z-axis controller 118 that the microprocessor 403 wishes to access. Address decoders 5038 and 5040 are available from TI as part numbers 74ALS138 and 74LS139, respectively. Microprocessor 403 communicates with position control register 408, status register 405, control register 406, DAC 404 and ADC 407 using 8-bit data bus 5006.

As shown in FIG. 5a, registers 5001 and 5003 within position control register 408 receive positioning information from microprocessor 403 on data bus 5006. Registers 5001–5004 are known in the art. Registers 5001 and 5003 are available from TI as part number 74ALS574. Registers 5002 and 5004 are available from TI as part number 74ALS273. Eight bit words on data bus 5006 are transmitted through registers 5001–5004 of position control register 408 to provide a 12-bit input to 12-bit DAC unit 5008 of DAC 409. DAC unit 5008 is a conventional DAC, known in the art, and available from Analog Devices (AD) as part number AD7541. The remaining ancillary elements of DAC 409 including operational amplifier 5009 and the illustrated resistors, capacitors and diodes are conventional elements known in the art. Operational amplifier 5009 is available from AD as part number OP-177E. DAC 409 provides an analog output signal on lead 5010.

As shown in FIG. 5b, lead 5010 is connected to one input of operational amplifier 5012 of summing node 410. Operational amplifier 5012 is available as part number AD712 from AD. The other input to operational amplifier 5012 is derived from the position feedback signal of the proximal sensor 1135 in fine Z-stage 120. Sensor 1135 provides an input to operational amplifier 5018. Operational amplifier 5018 is available from AD as part number AD712. The illustrated resistors and capacitors coupled to operational amplifier 5018 create a conventional buffer. The output of operational amplifier 5018 is provided to the other input of operational amplifier 5012. The output of summing node 410 is coupled to the input of integrator 420. Integrator 420 includes an operational amplifier such as part number AD712, available from AD. The associated resistors, capacitors and diodes of integrator 420 are known to one skilled in the art.

The output of integrator 420 is provided to notch filter 5013, which includes two resistors and two capacitors. The output of notch filter 5013 is provided to operational amplifier 5014, which is available from AD as part number AD712. The output of operational amplifier 5014 is provided to the input of amplifier 411.

Amplifier 411 is a conventional amplifier which includes an operational amplifier 5015 which is available from Apex as part number PA85. The illustrated diodes, resistors and capacitors of amplifier 411 are all known in the art. The output of amplifier 411 is provided to the piezoelectric element 1130 within fine Z-stage 120.

As shown in FIG. 5c, the electronic focus signal 115 is provided to ADC 407. Electronic focus signal 115 is routed through multiplexer 5022 to operational amplifier 5020. Multiplexer 5022 is a conventional part available from Siliconix as part number DG 211. Operational amplifier 5020 is available from AD as part number AD843. Operational amplifier 5020 buffers the electronic focus signal 115. The output of operational amplifier 5020 is provided to an input of ADC unit 5021. ADC unit 5021 is a conventional part available as part number AD7575 from AD. The other devices coupled to ADC unit 5021, as illustrated in FIG. 5c, are known in the art. In response to the electronic focus signal 115, ADC unit 5021 outputs an 8-bit digital signal representative of the electronic focus signal 115. The 8-bit digital output signal of ADC unit 5021 is provided to microprocessor 403 on data bus 5006.

FIG. 5c also illustrates flip flop 402. Flip flop 402 is programmed as one of the devices present within programmable logic device (PLD) 5023. PLD 5023 is available from Lattice Semiconductor as part number GAL20RA10. The inputs to PLD 5023 include a set input from comparator 401 and a reset input from control register 406. PLD 5.023 processes these inputs and generates an output representing the Q output of flip flop 402. This Q output is provided to status register 405. (PLD 5023 also has inputs and outputs unrelated to auto-focus operations.)

FIG. 5d illustrates status register 405. Status register 405 is a conventional register available as part number 74ALS541 from TI. As previously discussed, status register 405 receives the Q output of flip flop 402 from PLD 5023 (status register 405 also receives other information unrelated to auto-focus operations). The 8-bit output of status register 405 is provided to data bus 5006 such that microprocessor 403 can detect when flip flop 402 sets.

Control register 406 (FIG. 5d) receives an 8-bit input from microprocessor 403 on data bus 5006. Control register 406 is available from TI as part number 74ALS273. An output of control register 406 is coupled to PLD 5023, such that a signal from control register 406 can reset flip flop 402.

DAC 404 (FIG. 5A) also receives an 8-bit input from microprocessor 403 on data bus 5006. This 8-bit input is transmitted through register 5007 (available from TI as part number 74ALS574) to conventional DAC unit 5011 (available from National Semiconductor as part number DAC0808). DAC unit 5011 converts the incoming 8-bit signal into an analog output signal. This analog output signal is provided to an input of operational amplifier 5017 (available from AD as part number AD712). The output of operational amplifier 5017 is provided to an input of comparator 401. The electronic focus signal is provided to the other input of comparator 401. Comparator 401 includes comparator unit 5019, available from National Semiconductor as part number LM311. The output of comparator 401 is provided to flip flop 402 (FIG. 5c).

Figures 1, 5E:
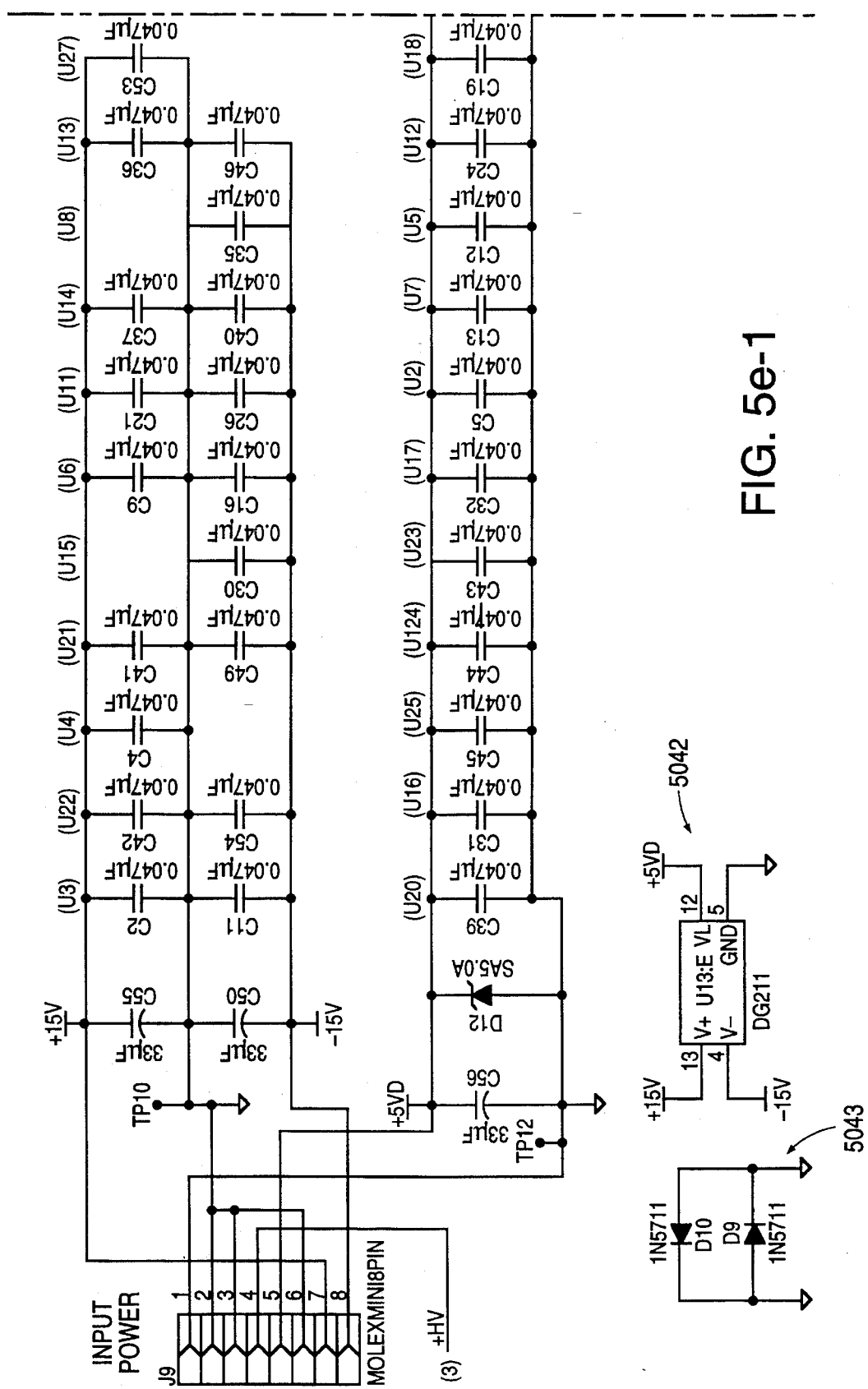
Figure 5E:
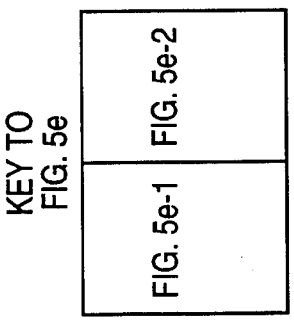
Figure 2:
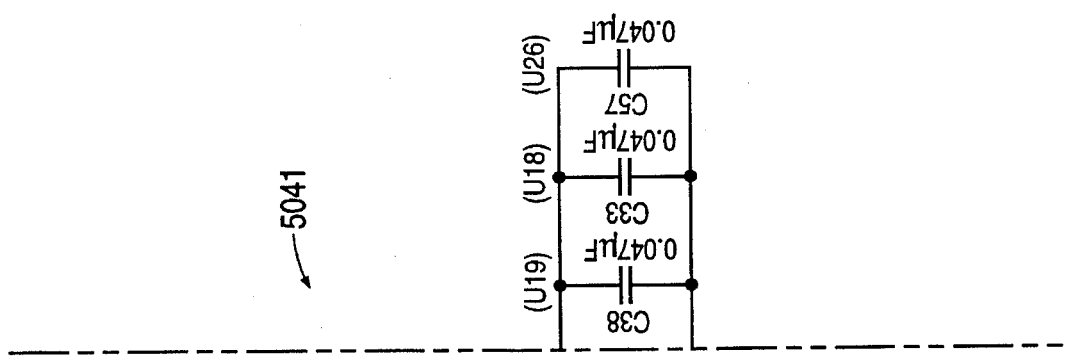

FIG. 5e illustrates the power supply connections 5041, 5042 and analog/digital grounding structure 5043 for Z-stage controller 118.

In one embodiment of the present invention, a coarse auto-focus operation is performed as follows. Host work station 116 (FIG. 1), through coarse Z-stage controller 117, instructs coarse Z-stage 122 to move target 112 downward 1000 microns along the Z-axis from the current position of target 112. If there is less than 1000 microns between the current position and the lowermost position along the Z-axis, then target 112 is moved to the lowermost position along the Z-axis. This ensures that target 112 is positioned below the focus position 203. This also ensures that target 112 is positioned at least a minimum distance below focus position 203, thereby allowing coarse Z-stage 122 to achieve consistent start-up characteristics (i.e., velocity, acceleration, etc.) before target 112 encounters a focused condition. Host work station 116 instructs microprocessor 403 (FIG. 4) to send a digital signal to DAC 404 such that the output of the DAC 404 is a voltage level corresponding to the threshold value 304 (FIG. 3b) determined during the initialization of the auto-focus system. In one embodiment, the input to DAC 404 is a digital input signal having a value of "24" out of a maximum value of "255". In response to another signal generated by host work station 116, control register 406 (FIG. 4) transmits a reset signal to reset flip flop 402 to its initial state (i.e., a logic "0").

Figure 6:
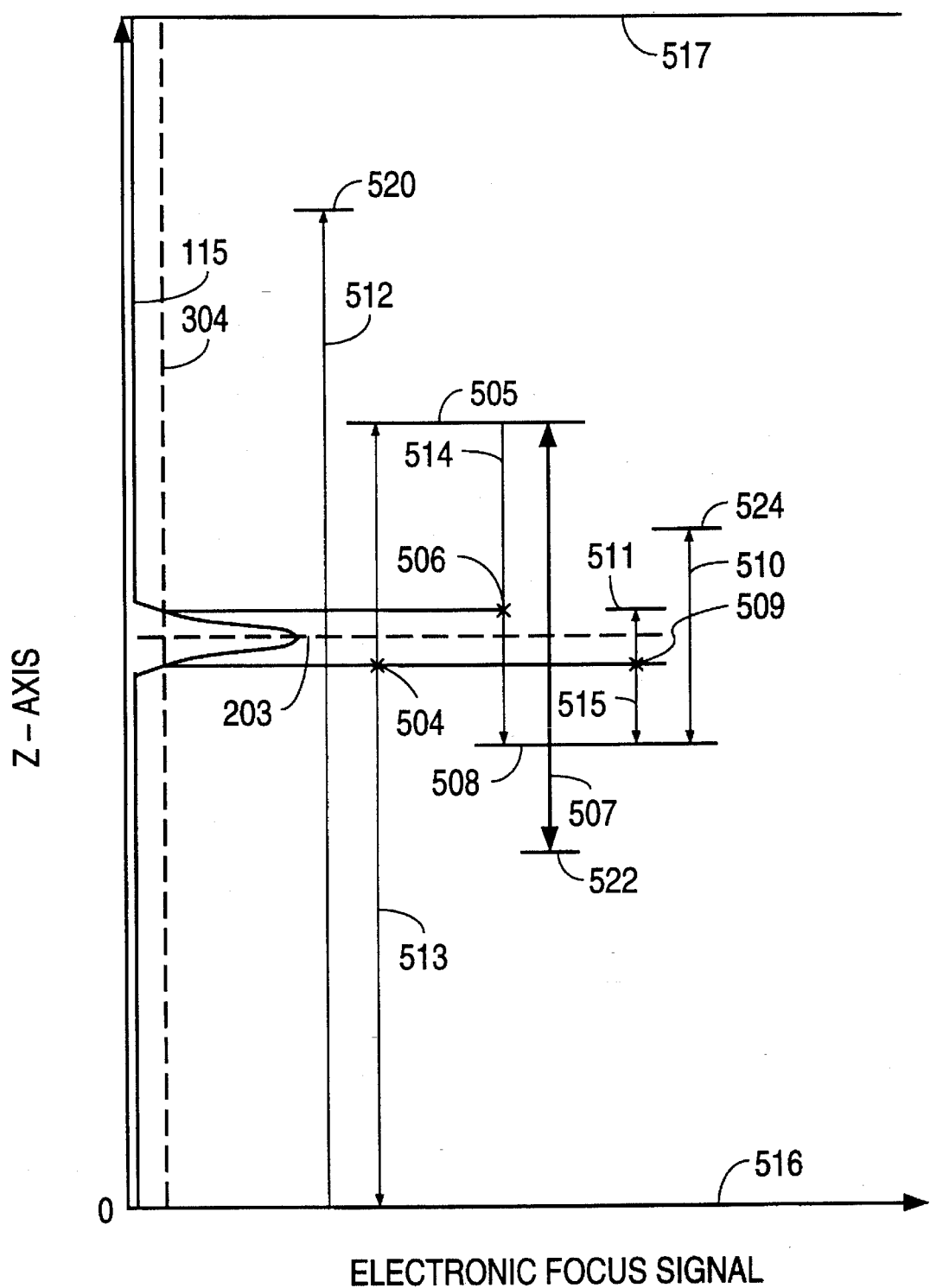
FIG. 6 is a graphic representation of three coarse passes performed during a coarse auto-focus operation according to the invention.

FIG. 6 is a graphic representation of three coarse passes performed during a coarse auto-focus operation according to one embodiment of the invention. A number of passes other than three can be used in other embodiments. The vertical axis in FIG. 6 illustrates the position of target 112 along the Z-axis. The horizontal axis in FIG. 6 illustrates the magnitude of the electronic focus signal 115. To perform the first coarse pass 513, the host work station 116 instructs the coarse Z-stage controller 117 to move coarse Z-stage 122, and thereby target 112, in the positive Z direction through a first safe operating distance 512 to a first safe operating position 520. In the first embodiment., first safe operating distance 512, from the starting position 516 to the first safe operating position 520, is 1000–6500 microns, depending on the original position of target 112, i.e., before target 112 is moved to starting position 516. The first safe operating distance 512 is also selected so that there is no chance that target 112 will contact objective lens 110 at position 517. In one embodiment, the first safe operating position 520 is 50 microns above focus position 203 (i.e., 50 microns above the focal point of the objective lens 110).

If a focus condition is not detected before target 112 moves through the first safe operating distance 512, the host work station 116 instructs the coarse Z-stage controller 117 to stop target 112 when the first safe operating position 520 is reached. This stops target 112 from crashing into the objective lens 110 at position 517. During the first coarse pass 513, the comparator 401 (FIG. 4) continuously compares the incoming electronic focus signal 115 with the threshold value 304 received from DAC 404. Because target 112 is initially out of focus, the electronic focus signal 115 will be less than the threshold value 304. Under these conditions, the output of comparator 401 is a positive voltage. As target 112 approaches the focus position 203, the electronic focus signal 115 increases. When the electronic focus signal 15 exceeds the threshold value, the output of comparator 401 transitions to a negative voltage, thereby setting flip flop 402. Once flip flop 402 is set, the voltage at the Q output transitions to a logic high state. The logic high state at the Q output is transmitted to the status register 405, causing a bit within status register 405 to change value. The microprocessor 403, which continuously monitors status register 405, thereby detects that flip flop 402 has latched. Upon detecting this latched condition, microprocessor 403 signals the host work station 116. In response, host work station 116 instructs the coarse Z-stage controller 117 to stop the coarse Z-stage 122, and thereby stop the movement of target 112.

Because the electronic focus signal 115 is an analog signal and flip flop 402 latches when the electronic focus signal 115 exceeds the threshold value 304, the possibility of missing a focused condition is eliminated. There are no discrete sampling periods during which the focused condition may be missed. Thus, flip flop 402 will latch even for a focus signal 115 having a narrow depth of focus 302 as illustrated in FIG. 3a. Consequently, target 112 may be moved upward at a much faster velocity than was possible with auto-focus microscopes of the prior art. In one embodiment, the average velocity of target 112 during the first coarse pass 513 is dependent on first safe operating distance 512. Target 112 is moved at an average velocity that enables target 112 to move through the first safe operating distance 512 in approximately one second. However, the maximum average velocity is approximately 3000 microns per second. This allows the first coarse pass to be completed a maximum time of approximately 1 second.

Because of the high velocity at which target 112 is moved during the first coarse pass and the significant amount of time (approximately 20–16 milliseconds) required to stop the movement of target 112 after a focused condition is detected, target 112 is positioned above the focus position 203 at the time that target 112 comes to rest ("target overshoot"). This is illustrated in FIG. 6, which shows that a focused condition is detected at first trip position 504, and[ that target 112 comes to rest at first stopping position 505. Thus, it is necessary to perform an additional pass or passes to position target 112 closer to the focus position 203. The distance required to stop target 112 during the first coarse pass is dependent upon the threshold value 304 (because a lower threshold value 304 causes flip flop 402 to latch sooner), the system gain (because a higher system gain allows for faster detection of a focused condition), the time required for microprocessor 403 to detect that flip flop 402 has latched, the time required for the microprocessor 403 to communicate this information to host work station 116, the time required[ for host work station 116 to issue a command to stop the coarse Z-stage 122, and the velocity of the coarse Z-stage 122 at first trip position 504.

Before the second coarse pass 514 is begun, host work station 116, through microprocessor 403, instructs control register 406 to transmit another reset signal to clear flip flop 402 (FIG. 4). This allows flip flop 402 to detect the next time electronic focus signal 115 exceeds the threshold value 304. Host work station 116 then instructs the coarse Z-stage 122 (through coarse Z-stage controller 117) to move target 112 in the negative Z direction at a velocity which is slower than the velocity of target 112 during the first pass. This motion continues until a focused condition is detected at second trip position 506, causing flip flop 402 to latch, or until target 112 moves through a predetermined second safe operating distance 507 to second safe operating position 522. This second safe operating distance 507 must be selected to assure that target 112 travels through the focus position 203. Thus, the second safe operating distance 507 is dependent on the amount of target overshoot experienced during the first coarse pass 513. In one embodiment, the second safe operating distance 507 is 1400 microns, unless target 112 was stopped less than 50 microns from first safe operating position 520. If target 112 was stopped less than 50 microns from first safe operating position 520, the second safe operating distance 507 is 200 microns. The latter second safe operating distances is smaller because target 112 is decelerating near the end of the first safe operating distance 512 so that it is easier to stop target 112, thereby decreasing the amount of target overshoot so that target 112 is stopped closer to the focus position 203 than would otherwise be the case. Because target 112 is closer to the focus position 203, a smaller second safe operating distance 507 can be used.

In one embodiment, it takes approximately 1 second for target 112 to pass through the entire second safe operating distance 507. The average velocity of target 112 during the second coarse pass therefore approximately 200 microns per second or 1400 microns per second, depending upon the second safe operating distance 507. While traversing the second safe operating distance 507, target 112 encounters a focused condition at second trip position 506. When the electronic focus signal 115 exceeds the threshold value 304, the flip flop 402 latches and target 112 is stopped in the same manner as in the first coarse pass 513. Target overshoot results in target 112 coming to rest below the first trip position 504. In FIG. 6, target 112 stops at second stopping position 508. Thus, an additional pass or passes are required to find the location of the focus position 203.

Before the third coarse pass 515 is begun, host work station 116 instructs control register 406 to transmit another reset signal to clear flip flop 402 (FIG. 4). This allows flip flop 402 to detect the next time the electronic focus signal 115 exceeds the threshold value 304. Host work station 116, through microprocessor 403, then instructs the coarse Z-stage controller 117 to move target 112 in the positive Z direction at a velocity which is slower than the velocity of target 112 during the second coarse pass 514. This motion continues until a focused condition 509 causes flip flop 402 to latch or until target 112 moves through a predetermined third safe operating distance 510 to a third safe operating position 524. Third safe operating distance 510 is selected to assure that target 112 travels through the focus position 203. Again, the third safe operating distance 510 is dependent on the amount of target overshoot associated with the second coarse pass. In one embodiment, the third safe operating distance 510 is 140 microns.

In one embodiment, it would take target 112 approximately one second to pass through the entire third safe operating distance 510. Therefore, the average velocity of target 112 during the third coarse pass 515 is approximately 140 microns per second. Prior to traversing the entire third safe operating distance 510, target 112 again encounters a focused condition at first trip position 504. When the electronic focus signal 115 exceeds the threshold value 304, the flip flop 402 latches and target 112 is stopped in the same manner as in the first and second coarse passes 513, 514.

Because of the relatively low velocity of coarse Z-stage 122 during the third coarse pass 515, target 112 comes to rest at a third stopping position 511 which can either be above or below the focus position 203. After the third coarse pass, the third stopping position 511 of target 112 is within +/−25 microns of the focus position 203. To achieve this degree of accuracy, all of the factors contributing to target overshoot are considered to determine the amount of time required to stop target 112 upon encountering a focused condition during the third coarse pass 515. Given the time required to stop target 112, the velocity of target 112 during the third coarse pass 515 is selected to assure that the third stopping position 511 of target; 112 is within +/−25 microns of the focus position 203.

If the full width half max 305 of electronic focus signal 115 is sufficiently wide, the coarse auto-focus operation previously described must be modified. The electronic focus signal 115 exhibits a wider full width half max 305 (FIG. 3a) as the numerical aperture of the objective lens 110 decreases or as the wavelength of laser beam 123 increases. Although there is no clear boundary which determines when an electronic focus signal 115 is "sufficiently wide" it is noted that an electronic focus signal 115 created with a laser beam 123 having a wavelength of 488 nm and an objective lens 110 having a numerical aperture of 0.13 or lower can be considered "wide." The full width half max 305 of such an electronic focus signal 115 is approximately 29 microns. When attempting a first coarse pass 513 on a "wide" electronic focus signal 115, the first stopping position 505 of target 112 is :relatively close to the second trip position 506. In certain cases, the first stopping position 505 of target 112 is at a position where the value of the electronic focus signal 115 may exceed the threshold value 304. That is, there is not enough target overshoot to guarantee that target 112 will "escape" the electronic focus signal 115. As a result of the first coarse pass, target 112 is close to second trip position 506 and is unable to obtain a high velocity before flip flop 402 latches during the second coarse pass. As a result, second stopping position 508 of target 112 is well short of peak 301. This condition would cause the coarse auto-focus operation previously described to miss the focused position 203.

To perform a coarse auto-focus on a "wide" electronic focus signal 115, target 112 is initially moved 2000 microns (rather than 1000 microns) below the current target position. If target 112 is within 2000 microns of the lowermost position along the Z-axis, target 112 is moved this lowermost position. This provides target 112 with an additional distance in which to accelerate to a high velocity before reaching first trip position 504. The high velocity ensures that target 112 overshoots the second trip position 506. During the second coarse pass 514, target 112 is moved downward along the Z-axis through second safe operating distance 507. The second safe operating distance 507 and the velocity of target 112 during the second coarse pass 514 is determined in the manner previously described. However, rather than monitoring the status flip flop 402 during the second coarse pass 514, host work station 116 instructs microprocessor 403 to record the output of ADC 407 at a predetermined interval while the coarse Z-stage 122 is moving target 112 at an approximately constant velocity. The values recorded by microprocessor 403 therefore roughly correspond to values of the electronic focus signal 115 at regular distances along the Z-axis. Based on these values, the focus position 203 is calculated. Because movement of the coarse Z-stage 122 generally induces noise in the electronic focus signal 115, the values recorded by microprocessor 403 exhibit peaks at positions other than the focus position 203. Microprocessor 403 therefore uses a "median point" method to filter the noise and obtain the true position of focus position 203. The median point method calculates the sum of the values previously stored by microprocessor 403 and determines the position along the Z-axis at which half of this sum was reached during the second coarse pass. Host work station 116 then issues a command to move target 112 in the positive Z-direction to this position. The median point method assumes that noise in the electronic focus signal 115 is due to irregularity of movement of the coarse Z-stage 122 and that this irregularity occurs randomly and is equally probable on either side of the focus position 203 along the Z-axis.

After one of the previously described coarse auto-focus operations is completed, an additional fine auto-focus operation can be performed. During a fine auto-focus operation, the electronic focus signal of FIG. 3a is used. Thus, the zero position offset 310 and additional photodetector gain illustrated in FIG. 3b are not utilized during a fine auto-focus operation. During a fine auto-focus operation, target 112 is moved by a fine Z-stage 120 which includes a piezoelectric element 1130. Fine Z-stage 120 is described in detail later. Before the fine auto-focus operation is performed, target 112 must first be positioned such that focus position 203 is within the operating range of the fine Z-stage 120. In one embodiment of the invention, the fine Z-stage 120 has an operating range of 50 microns along the Z-axis. Consequently, by performing the coarse auto-focus operation described above, in which target 112 is positioned within +/−25 microns of the focus position 203, target 112 is positioned such that focus position 203 is within the operating range of the fine Z-stage 120.

Figure 7:
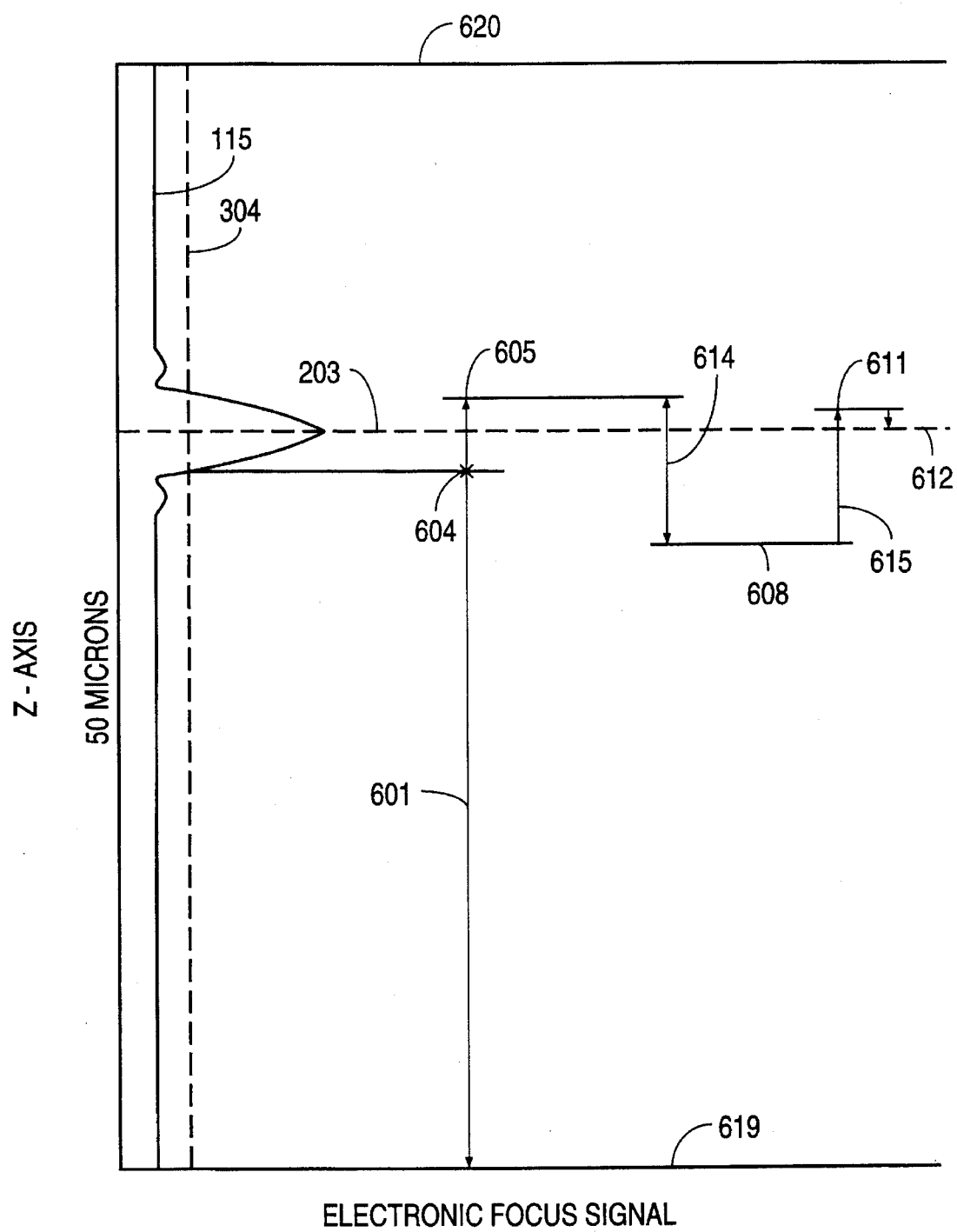
FIG. 7 is a graphic representation of one embodiment of a fine auto-focus operation according to one embodiment of the invention.

FIG. 7 is a graphic representation of one embodiment of a fine auto-focus operation according to one embodiment of the invention. Although FIG. 7 illustrates two fine passes, a number of passes other than two can be used in other embodiments. The vertical axis in FIG. 7 illustrates the position of target 112 along the Z-axis. The horizontal axis in FIG. 7 illustrates the magnitude of the electronic focus signal 115.

Prior to a first fine pass 601, microprocessor 403 sends a zeroing signal to position control register 408 (FIG. 4). This signal is transmitted through DAC 409, summing node 410 and amplifier 411 to the piezoelectric element 1130 in fine Z-stage 120. Fine Z-stage 120, which was positioned in the middle of its operating range during the coarse auto-focus operation, moves to the lowermost position 619 of its operating range (FIG. 7) in response to the zeroing signal. Microprocessor 403 then instructs control register 406 to transmit a reset signal to clear flip flop 402. This allows flip flop 402 to detect when the electronic focus signal 115 exceeds the threshold value 304.

To begin the first fine pass 601, microprocessor 403 transmits a series of signals to position control register 408 (FIG. 4), thereby causing the fine Z-stage 120 to move target 112 in the positive Z direction at a relatively high velocity. In one embodiment, this velocity is approximately 75 microns per second. While it is necessary to precisely control the movement of target 112 during the first fine pass 601, the piezoelectric element 1130 of the fine Z-stage 120 has a slightly non-linear position response to the voltage supplied by amplifier 411. To correct for this characteristic, a proximity sensor 1135 in the fine Z-stage 120 produces an electrical feedback signal which is linearly proportional to the position of target 112 along the Z-axis. This linear feedback signal is transmitted to summing node 410 and subtracted from the output signal of DAC 409 to create an error signal. This error signal is representative of the non-linear response of piezoelectric element 1130. When integrator 420 receives any non-zero error signal, the integrator 420 generates an output which forces the error signal to zero. In this manner, integrator 420 compensates for the non-linear response of the piezoelectric element 1130, thereby allowing for linear control of the position output of piezoelectric element 1130.

Before target 112 reaches the top of the operating range 620 of the fine Z-stage 120, the electronic focus signal 115 will exceed the threshold value 304 at a first trip position 604, since, as described above, the coarse auto-focus operation ensures that the focus position 203 lies within the range of the fine Z-stage 120 (FIG. 7). At this time, flip flop 402 latches, thereby enabling a bit in the status register 405. The microprocessor 403, which continuously monitors status register 405, detects that the status of flip flop 402 has changed. Upon detecting this change, microprocessor 403 signals the position control register 408 to stop the movement of the fine Z-stage 120, and thereby stop the movement of target 112. Target 112 comes to rest at a first stopping position 605 which can either be above or below the focus position 203.

Consequently, prior to performing a second fine pass 615, microprocessor 403 instructs the fine Z-stage 120 to reposition target 112 a predetermined fixed distance 614 in the negative Z direction. This distance 614 is selected to assure that the second stopping position 608 of target 112 is below the focus position 203. Factors which must be considered when selecting distance 614 include the velocity of target 112 during the first fine pass 601, the threshold value 304 (because a lower threshold value 304 causes flip flop 402 to latch sooner), the system gain (because a higher system gain allows for faster detection of a focused condition), and the time required for microprocessor 403 to detect that flip flop 402 has latched. In one embodiment, distance 614 is 3.6 microns.

After target 112 has been repositioned at second stopping position 608, a second fine pass 615 is performed by moving target 112 in the positive Z direction at a relatively low velocity of approximately 7.5 microns per second. During the second fine pass 615, microprocessor 403 monitors the output of ADC 407 (FIG. 4), rather than the status of flip flop 402. The output of ADC 407 is a digital representation of the electronic focus signal 115. In this manner, microprocessor 403 measures the value of the electronic focus signal 115 as target 112 moves along the Z-axis. During the second fine pass 615, software within microprocessor 403 maintains an updated record of the maximum output of ADC 407 and the position of target 112 at this maximum output. Upon detecting an increasing electronic focus signal 115 followed by a decreasing electronic focus signal 115, the microprocessor 403 instructs the fine Z-stage 120 to stop the motion of target 112 at third stopping position 611. Third stopping position 611 is located above the focus position 203 because of target overshoot which occurs for reasons similar to those described above. The microprocessor 403 then instructs the fine Z-stage 120 to move target 112 in the negative Z direction to the position 612 where the maximum output of ADC 407 was detected.

In one embodiment, position 612 is typically within one tenth of a micron of the focus position 203. This accuracy is determined by the velocity of target 112 and the number of bits used in ADC 407. The slower the velocity of target 112 during the second fine pass 615 and the greater the number of bits used in ADC 407, the closer position 612 will be to the focus position 203. The entire fine auto-focus operation is completed in approximately one second. This time is dependent upon the location of the focus position 203 within the range of the fine Z-stage 120. The computer code used to perform an auto-focus operation in accordance with the first embodiment of the fine auto-focus of the present invention is set forth in Appendix A. The computer code of Appendix A is written in neuron C language, which requires an ECHELON compiler.

Figure 8:
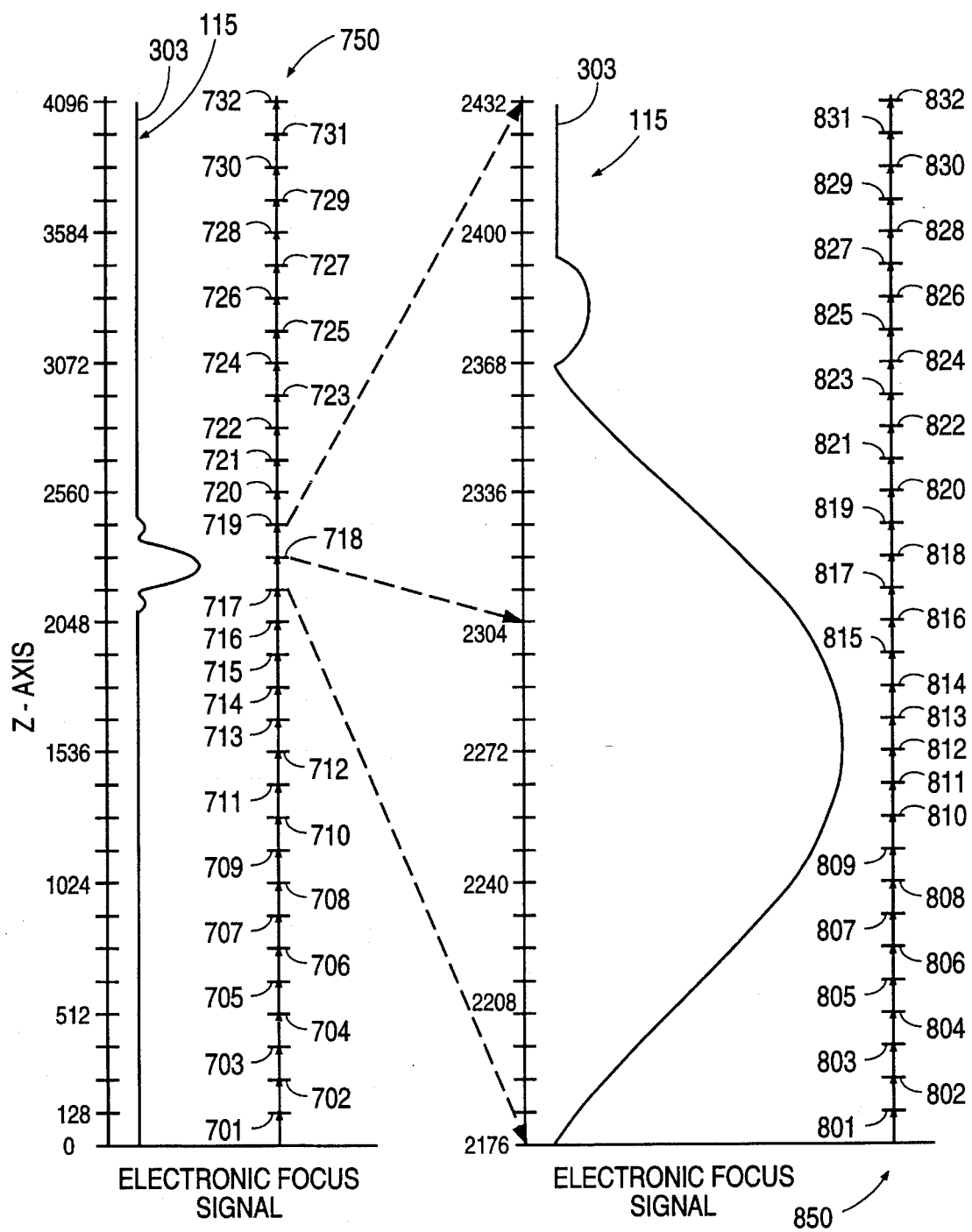
FIG. 8 is a graphic representation of another embodiment of a fine auto-focus operation according to one embodiment of the invention.

FIG. 8 is a graphic representation of another embodiment of a fine auto-focus operation according to one embodiment of the invention. Although FIG. 8 illustrates two fine passes, a number of passes other than two can be used in other embodiments. The vertical axis in FIG. 8 illustrates the position of target 112 along the Z-axis. The horizontal axis in FIG. 8 illustrates the strength of the electronic focus signal 115. In the first fine pass 750, target 112 is moved to each of positions 701–732. In the second fine pass 850, target 112 is moved to each of positions 801–832.

Prior to first fine pass 750, microprocessor 403 sends a zeroing signal to position control register 408 (FIG. 4). This signal is transmitted through DAC 409, integrator 420, summing node 410 and amplifier 411 to the piezoelectric element 1130 of fine Z-stage 120. Fine Z-stage 120, which was positioned in the middle of its operating range during the coarse auto-focus operation (i.e., Step No. 2048 in FIG. 8), moves to the bottom of its operating range (i.e., Step No. 0 in FIG. 8) in response to the zeroing signal.

During first fine pass 750, target 112 is moved upward through the full range of motion of fine Z-stage 120 (i.e., 50 microns). As shown in FIG. 8, this range is divided into 4096 steps. Other numbers of steps can be used in other embodiments. Microprocessor 403 can position target 112 at any one of these steps by sending a digital word to DAC 409 (FIG. 4). During first fine pass 750, microprocessor 403 sequentially provides 32 digital words to DAC 409, causing the fine Z-stage 120 to sequentially move target 112 to each of 32 positions 701–732. Each of the 32 positions 701–732 are separated by 128 steps (approximately 1.56 microns). At each of the 32 positions 701–732, the output voltage of ADC 407 (corresponding to the electronic focus signal 115) is repeatedly measured and digitally filtered (low-pass) by microprocessor 403 to obtain a single value for each of the 32 positions 701–732. Microprocessor 403 saves the peak value and the position at which the peak value occurred.

Because the 32 positions 701–732 of first fine pass 750 are spaced 1.56 microns apart, and the electronic focus signal 115 has a depth of focus 302 of approximately 2.54 microns, a focused condition will not be missed. A relative peak is found within the 32 positions 701–732 as long as there is enough system gain to distinguish the electronic focus signal 115 from the background value 303 and enough system gain such that the electronic focus signal 115 can be detected by the ADC 407. System gain is determined by the laser power, the gain of photodetector 114, and the reflectivity of the sample. The present invention therefore has an advantage over prior art auto-focus systems, which require a much larger system gain in order for an auto-focus operation to be performed.

The position 718 at which the peak value is detected during first fine pass 750 (illustrated as Step No. 2304 in FIG. 8) becomes the center of the second fine pass 850. Microprocessor 403 instructs fine Z-stage 120 to move target 112 to a position 128 steps below the position 718 at which the peak value was detected during the first fine pass 750 (i.e., at Step No. 2176). In other embodiments, a different number of steps may be used. Next, microprocessor 403 sequentially provides 32 digital words to the DAC 409 (FIG. 4), causing the fine Z-stage 120 to sequentially move target 112 upward to each of 32 positions 801–832. Each of the 32 positions 801–832 are separated by 8 steps (approximately 0.977 microns). The total distance of the second fine pass is 3.125 microns. At each of the 32 positions 801–832, the output voltage of ADC 407 (corresponding to the electronic focus signal 115) is repeatedly measured and digitally filtered (low-pass) by microprocessor 403 to obtain a single value for each of the 32 positions 801–832. Microprocessor 403 saves the peak value and the position at which the peak value occurred.

In an alternate embodiment, second fine pass 850 is performed by positioning target 112 128 steps above the position 718 at which the peak coarse sample value was detected during the first fine pass 750 (i.e., at Step No. 2432). Microprocessor 403 then sequentially provides 32 digital words to DAC 409, causing the fine Z-stage 120 to sequentially move target 112 downward through 32 positions 832–801.

After passing through the entire 3.125 micron range of second fine pass 850, microprocessor 403 instructs the fine Z-stage 120 to position target 112 at the position 812 at which the peak value occurred during the second fine pass 850 (illustrated as Step No. 2272 in FIG. 8). At the end of second fine pass 850, target 112 is positioned within at least 0.0488 microns of the focus position 203, i.e., half the length between each of the 32 positions of the second fine pass 850.

An advantage of the second embodiment of the fine auto-focus operation is that target 112 is positioned quickly and reliably without relying on a threshold value. In this embodiment, fine Z-stage 120 positions target 112 sixty-seven times (including sixty-four positions at which measurements are taken and three positions at which measurements are not taken) to perform the fine auto-focus operation in approximately 0.9 seconds. The computer code used to perform an auto-focus operation in accordance with the second embodiment of the fine auto-focus of the present invention is set forth in Appendix A.

Figure 9:
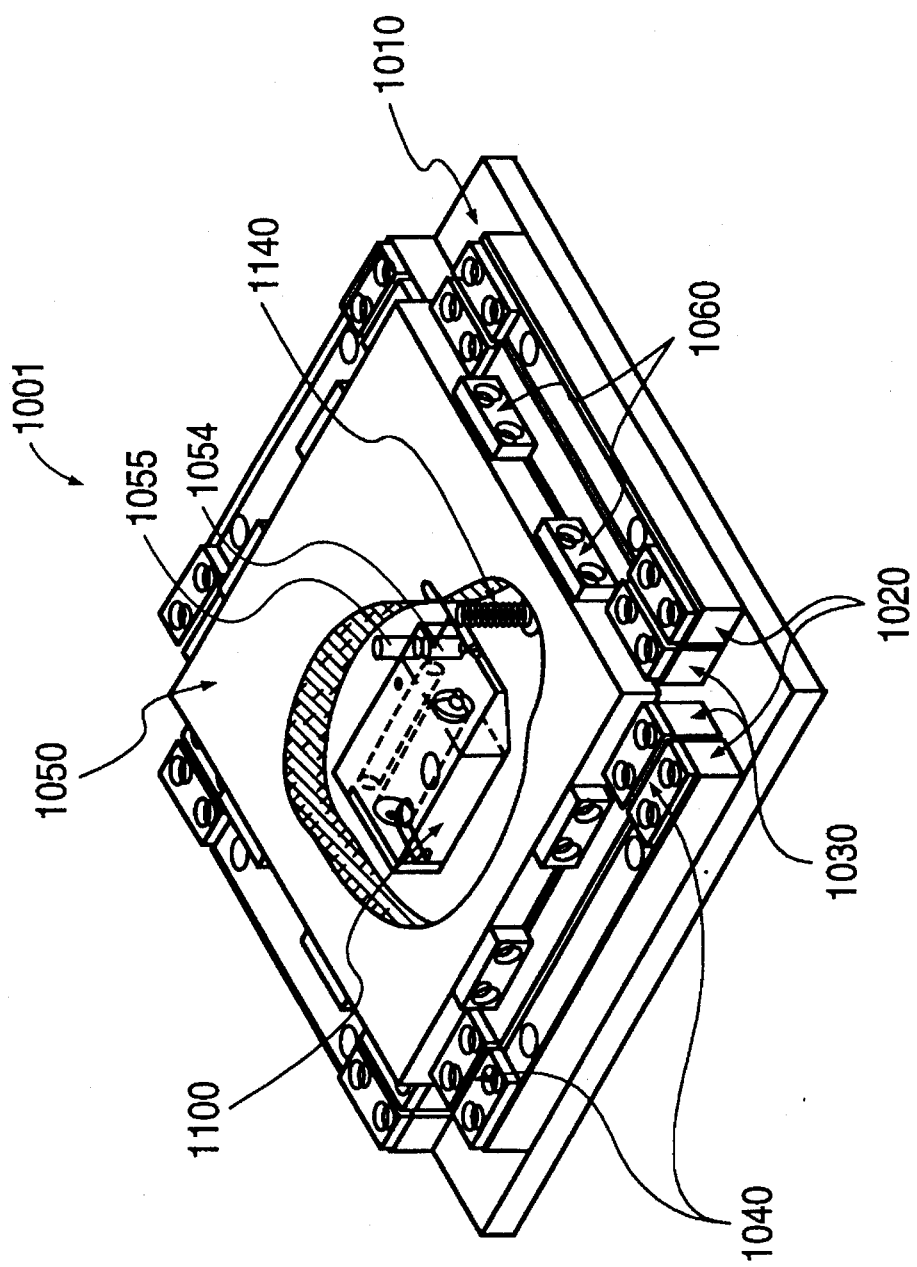
FIG. 9 is an isometric view of a fine Z-stage.
Figure 9:
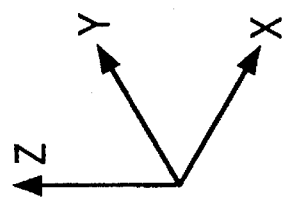
Figure 10:
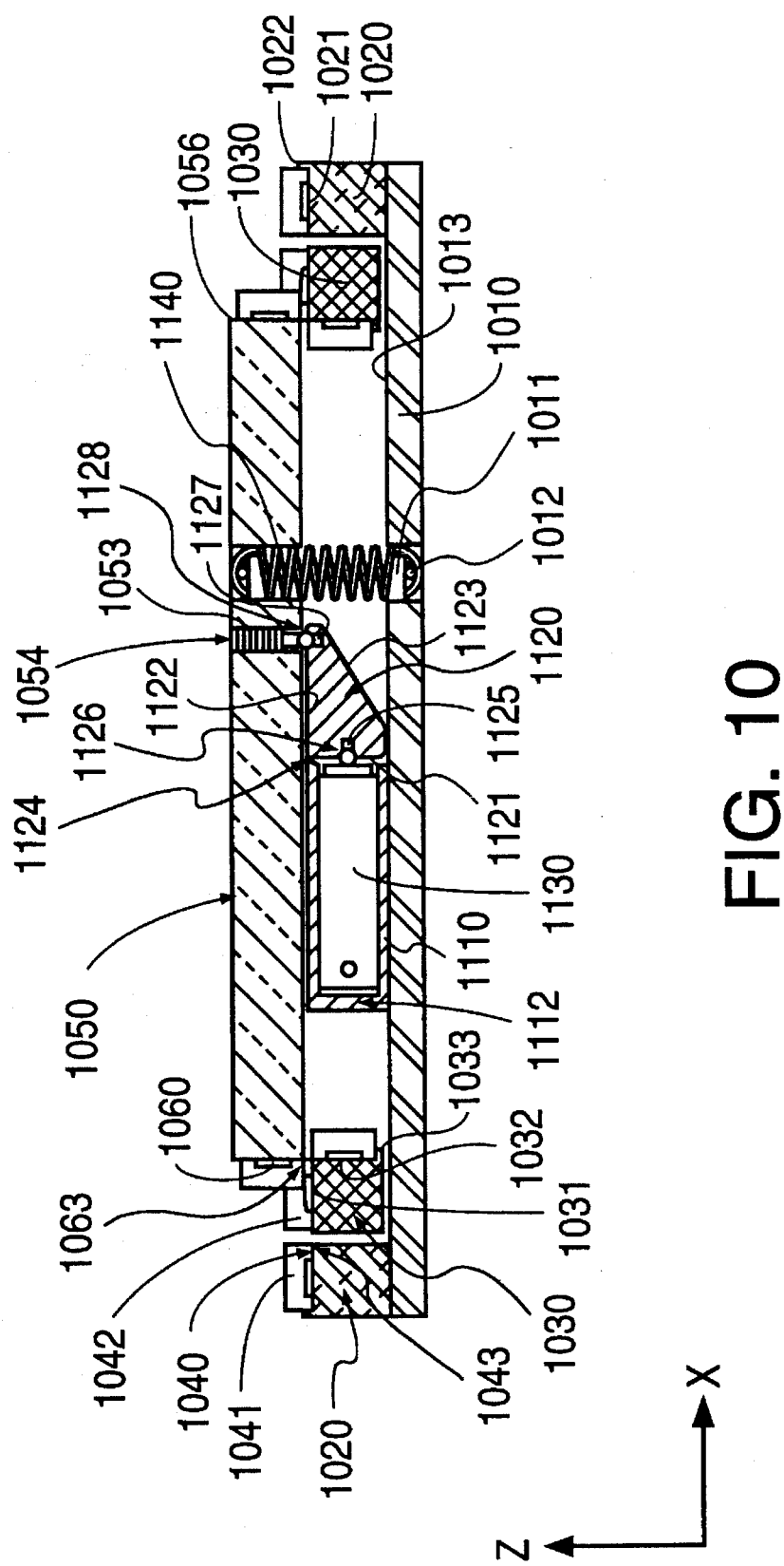
FIG. 10 is a cross sectional view of the fine Z-stage of FIG. 9.
Figure 11:
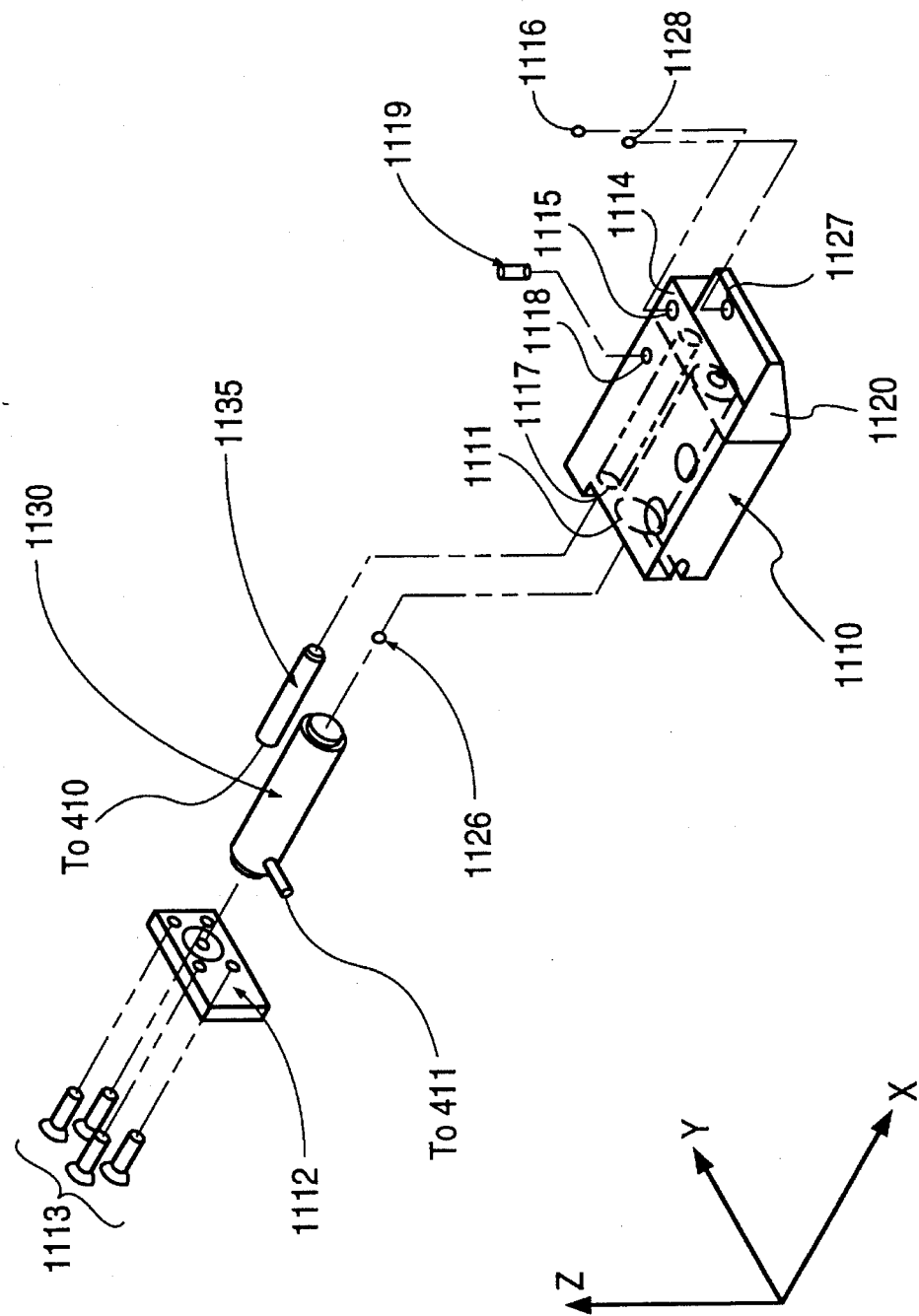
FIG. 11 is an exploded isometric view of a piezoelectric element, sensor and bottom plate of the fine Z-stage of FIG. 9.

A preferred fine Z-stage 120 is shown in FIGS. 9–11. Referring to FIG. 9, the fine Z-stage 120 includes a square bottom plate 1010, four stationary bars 1020 fixedly connected along the edges of the bottom plate 1010, four rotating bars 1030 pivotally connected to the stationary bars 1020 such that each rotating bar 1030 is connected to one stationary bar 1020, and a square top plate 1050 pivotally connected along its edges to the four rotating bars 1030. A first set of horizontally-disposed flexures 1040 is connected between upper surfaces of the stationary bars 1020 and the rotating bars 1030, and a second set of vertically-disposed flexures 1060 is connected between side surfaces of the rotating bars 1030 and the edges of the top plate 1050. In addition, the fine Z-stage 120 includes a piezoelectric actuator mechanism 1100 disposed in a space formed between the top plate 1050 and the bottom plate 1010. Finally, an optional biasing spring 1140 is connected between the top plate 1150 and the bottom plate 1110 for biasing the top plate 1150 toward the bottom plate 1110.

Referring to FIG. 10, the bottom plate 1010 is preferably a flat aluminum sheet 8 by 8 inches wide and 0.375 inch thick. As shown in FIG. 10, the bottom plate 1010 includes a receiving hole 1011 within which is located a pin 1012 for securing a first end of the optional biasing spring 1140. The bottom plate 1010 also includes an upper surface 1013.

Referring back to FIG. 9, the stationary bars 1020 are preferably aluminum bars 5.5 inches long, 0.65 inch high and 0.5 inch wide. The stationary bars 1020 are connected to the upper surface 1013 of the bottom plate 1010 using screws. The stationary bars 1020 are formed into a square frame and located along the outer edges of the bottom plate 1020. Referring again to FIG. 10, each stationary bar 1020 includes an upper surface 1021. A lip 1022 is formed along an outer edge of the upper surface 1021 of each stationary bar 1020.

The rotating bars 1030 are preferably aluminum bars which are 5.5 inches long, 0.5 inch high and 0.6 inch wide. The rotating bars 1030 are pivotally connected to the stationary bars 1020, each rotating bar 1030 being connected to one stationary bar 1020. Each rotating bar 1030 includes an upper surface 1031 and an inner side surface 1032. A lip 1033 is formed along a lower edge of the inner side surface 1032 of each rotating bar 1030.

As shown in FIG. 10, thin horizontally-disposed flexures 1040 are connected between the stationary bars 1020 and the rotating bars 1030. Each flexure 1040 is a thin sheet of 303 stainless steel which is 1 inch long, 1 inch wide and approximately 0.01 inch thick. Each flexure 1040 has one portion connected to the upper surface 1021 of a stationary bar 1020 by a first fixture 1041, a second portion connected to the upper surface 1031 of a rotating bar 1030 by a second fixture 1042, and a small pivot portion 1043 located between the stationary bars 1020 and the rotating bars 1030. Two flexures 1040 are connected between each stationary bar 1020 and its associated rotating bar 1030, thereby restricting each rotating bar 1030 to pivot around the pivot portion 1043 such that the rotating bar 1030 remains in a parallel relationship with its associated stationary bar 1020.

The top plate 1050 is preferably a flat aluminum sheet 5.5 by 5.5 inches wide and 0.5 inch thick. Referring to FIG. 10, the top plate 1050 includes a receiving hole 1051 within which is located a pin 1052 for securing a second end of the optional biasing spring 1140 (discussed below). In addition, the top plate 1050 defines threaded holes 1053 (only one shown) for receiving preload screws 1054 and 1055 (see FIG. 9). Finally, the top plate 1050 includes side surfaces 1056.

As shown in FIG. 10, thin vertically-disposed flexures 1060 are connected between the top plate 1050 and the rotating bars 1030. Similar to the above-described horizontally-disposed flexures 1040, each vertically-disposed flexure 1060 is a thin sheet of 303 stainless steel which is 1 inch long, 1 inch wide and 0.01 inch thick. Each vertically-disposed flexure 1060 has one portion connected to the inner side surface 1032 of a rotating bar 1030 by a fixture 1061, a second portion connected to a side surface 1056 of top plate 1050 by a fixture 1062, and a pivot portion 1063 located between the rotating bars 1030 and the top plate 1050. Two flexures 1060 are connected between each rotating bar 1030 and one edge of the top plate 1050, thereby restricting the top plate 1050 to pivot with respect to the rotating bars 1030 such that the top plate 1050 remains in a parallel relationship with the rotating bars 1030.

Referring to FIGS. 10 and 11, the piezoelectric actuator mechanism 1100 includes a retainer block 1110 connected to the bottom plate 1010, a rotating block 1120 integrally and pivotally connected to the retainer block 1110, and an extending portion 1114 integrally and pivotally connected to the retainer block 1110. Further, a piezoelectric element 1130 is received in the retainer block 1110 and has a free end contacting the rotating block 1120. Finally, a sensor 1135 is received in the retainer block 1110 and generates a signal corresponding to an amount of rotation of the extending portion 1114.

Referring to FIG. 11, the retainer block 1110 is formed from 7075-T6 high-strength aluminum alloy and is approximately 1.1 inch long, 0.6 inch wide and 0.1 inch thick. The retainer block 1110 defines a first through-hole 1111 for receiving the piezoelectric element 1130. A stainless steel plate 1112 is connected by fasteners 1113 to retain the piezoelectric element 1130 within the through-hole 1111. In addition, the retainer block 1110 defines a second through-hole 1117 for receiving the sensor 1135. The retainer block 110 also includes a hole 1118 for receiving a sensor lock screw 1119 which contacts and secures the sensor 1135.

As shown in FIG. 11, an extended portion 1114 is formed from 7075-T6 high-strength aluminum alloy and is integrally connected to the upper surface of the retainer block 1110 by a thin flexure. The extended portion 1114 includes a socket 1115 for receiving a 0.125 inch diameter steel ball 1116 which contacts the top plate 1150. The extended portion 1114 is preloaded downward by the preload screw pressing against the steel ball 1116 (see FIG. 9). The sensor 1135 transmits a signal representing a distance between the sensor and a side wall of the extended portion 1114 which varies in response to the rotation of the extended portion 1114. The signal is used to determine the vertical displacement of the top plate 1050, as discussed above.

As shown in FIGS. 10 and 11, the rotating block 1120 is a prism formed from 7075-T6 high-strength aluminum alloy and is approximately 1 inch long. As shown in FIG. 10, the rotating block 1120 includes a vertical side wall 1121, an upper wall 1122 and a diagonal wall 1123. The rotating block 1120 is integrally connected to the upper surface of the retainer block 1110 by a flexure 1124. The side wall 1121 defines a socket 1125 for receiving a 0.125 inch diameter steel ball 1126 which contacts an end of the piezoelectric element 1130. In addition, the upper wall 1122 defines a second socket 1127 for receiving another 0.125 inch diameter steel ball 1128 which contacts the preload screw 1154 mounted in the top plate 1050. It is noted that the steel ball 1128 is located further from the flexure 1124 than the steel ball 1116, which is mounted on the extended portion 1114.

The piezoelectric element 1130 is a cylindrical unit housed in the through-hole 1111 of the retainer block 1110 such that movement of a first end is prevented by the plate 1112, and a second end contacts the vertical side wall 1121 of the rotating block 1120 through the ball 1126. The piezoelectric element 1130 is connected to amplifier 411, as discussed above. A preferred piezoelectric element is sold by Physic Instrumente of Waldbronn, Germany under model number P830.20.

The sensor 1135 is also a cylindrical unit housed in the through-hole 1117 and spaced a predetermined distance from the vertical side wall of the extended portion 1114. The sensor 1135 is connected to summing node 410, as discussed above. Once the sensor 1135 is mounted a predetermined distance from the side wall of the extended portion 1114, the sensor lock screw 1118 is tightened against the side of the sensor to prevent movement of the sensor 1135 within the through-hole 1117. A preferred sensor is sold by Kaman Instrumentation of Colorado Springs, Colo. under model number SMU 9000-15N.

Finally, an optional biasing spring 1140 may be connected between the Din 1012 formed in the bottom plate 1010 and the pin 1052 connected to the top plate 1050.

In operation, when no actuating voltage is applied to the piezoelectric element 1130, the optional biasing spring 1140 pulls the top plate toward the bottom plate until the top plate abuts and rests against the ball 1116. In this position, the upper surface 1021 of the stationary bars 1020 and the upper surface 1031 of the rotating bars 1030 are aligned such that the horizontal flexures 1040 are substantially planar. In addition, the inner side surfaces 1032 of the rotating bars 1030 and the side surfaces 1055 of the top plate 1050 are aligned such that the vertical flexures 1060 are substantially planar.

Upon application of an actuating voltage across the piezoelectric element 1130, the piezoelectric element 1130 presses against the side wall 1121 of the rotating block 1120 through the ball 1126, thereby causing the rotating block 1120 to rotate about a pivot portion 1062 of the flexure 1060 connecting the rotating block 1120 to the retainer block 1110. As the rotating block 1120 is rotated away from the retainer block 1110, the ball 1128 presses upward on the preload screw 1154, causing the top plate 1050 to move upward. Upward movement of the top plate 1050 causes a rotation of the rotating bars 1030. As the rotating bars 1030 are rotated, the horizontally disposed flexures 1040 restrain the rotating bars 1030 such that they remain parallel with their associated stationary bars 1020. In addition, the vertically disposed flexures 1060 cause the top plate 1050 to remain parallel with each of the rotating bars 1030. As a result, the rotating bars 1030 act as torsion bars which prevent unwanted rotation or translation of the top plate 1050, there by resulting in the upper surface of the top plate 1050 remaining parallel with the bottom plate 1010.

Returning to FIG. 1, the mirror control 124 of FIG. 1 is used to rotate X-mirror 106 and Y-mirror 108 such that laser beam 123 can scan more than a single point on target 112 while performing the coarse and/or fine auto-focus operations. Thus, if X-mirror 106 is rotated while Y-mirror 108 is held still, laser beam 123 will trace a line along the X-axis on target 112. Similarly, X-mirror 106 can be held still while Y-mirror 108 is rotated, thereby tracing a line along the Y-axis on target 112. In one embodiment of the present invention, the coarse and fine auto-focus operations are performed by scanning a line, rather than a point, on target 112. This line scan is performed at a frequency of approximately 8 Khz. Finally, both X-mirror 106 and Y-mirror 108 may be rotated to trace either a small area or selected parts of a larger area in the X-Y plane of target 112. By using a line scan or an area scan and averaging the result of the scan to create electronic focus signal 115, the determination of the focus position during the coarse and/or fine auto-focus operations becomes less sensitive to local height variations on the surface of target 112.

While the present invention has been described in connection with specific embodiments, variations on these embodiments will be obvious to those having ordinary skill in the art. For example, target 112 may be moved by means other than a stepper motor or a piezoelectric element, such as a linear voice coil motor or an electrostrictive actuator. Furthermore, target 112 can initially be positioned above the focus position, with the first pass in any of the embodiments beginning by moving target 112 in a negative Z direction. In addition, although the present invention was described in connection with a microscope that reflects a maximum intensity to the photodetector during a focused condition, it is clear that the invention may be modified to operate with a microscope that reflects a minimum intensity to the photodetector during a focused condition.

Furthermore, although the invention, as described, utilizes a laser beam 123 to perform both the auto-focusing and imaging operations, it is understood that a confocal laser optical system could be used to perform an auto-focusing operation for a non-confocal microscope system which utilizes only a white light source to perform the imaging operation. Such an application is advantageous because a non-confocal microscope system utilizing a white light imaging source results in a focus signal which is sinc function, rather than a sinc squared function. Because the sinc function does not exhibit a peak which is as pronounced as the sinc squared function, it is more difficult to determine the focus position using a focus signal generated by a non-confocal, white light optical system. Therefore, using a confocal laser optical system to generate the focus signal used to perform the auto-focus operation in a white light microscope results in a superior electronic focus signal, thereby allowing the auto-focus operation to be performed with greater precision.

Accordingly, the present invention is only intended to be limited by the following claims.

What is claimed is:

1. A method for automatically focusing a microscope, comprising the steps of:

continuously moving a target relative to a lens of the microscope, the target being moved in a first direction through a first distance;

continuously generating an electronic focus signal during movement of the target, the magnitude of the electronic focus signal being a function of the magnitude of light reflected from a surface of the target through an optical path of the microscope;

comparing the absolute value of the magnitude of the electronic focus signal to a threshold value; and stopping the movement of the target when the absolute value of the magnitude of the electronic focus signal exceeds the threshold value.

2. The method of claim 1, wherein the step of stopping further comprises the step of latching a flip flop when the absolute value of the magnitude of the electronic focus signal exceeds the threshold value.

3. The method of claim 1, wherein the target is moved by a stepper motor.

4. The method of claim 1, wherein the target is moved by a piezoelectrically driven element.

5. The method of claim 1, wherein movement of the target is stopped if the target moves through the first distance without the absolute value of the magnitude of the electronic focus signal exceeding the threshold value.

6. The method of claim 1, wherein the step of comparing further comprises the steps of:

applying the electronic focus signal to a first terminal of a comparator;

applying a threshold signal to a second terminal of the comparator, the threshold signal having a magnitude representative of the threshold value, such that the comparator compares the magnitude of the electronic focus signal to the magnitude of the threshold signal;

outputting an output signal from the comparator as a function of the comparison of the magnitude of the electronic focus signal to the magnitude of the threshold signal;

inputting the comparator output signal to a flip flop.

7. The method of claim 1, wherein the step of continuously generating further comprises:

transmitting a laser beam through the lens to a surface of the target;

measuring the intensity of the light reflected from the surface of the target through the optical path of the microscope; and transforming the measured intensity into the electronic focus signal.

8. The method of claim 7, wherein the step of transmitting further comprises moving the laser beam to define a line on the surface of the target.

9. The method of claim 7, wherein the step of transmitting further: comprises moving the laser beam to define an area on the surface of the target.

10. A method for automatically focusing a microscope comprising the steps of:

continuously moving a target relative to a lens of the microscope, the target being moved in a first direction through a first distance;

continuously generating an electronic focus signal during movement of the target, the magnitude of the electronic focus signal being a function of the magnitude of light reflected from a surface of the target through an optical path of the microscope;

comparing the absolute value of the magnitude of the electronic focus signal to a threshold value;

stopping the movement of the target when the absolute value of the magnitude of the electronic focus signal exceeds the threshold value;

continuously moving the target relative to the lens in a second direction through a second distance, the second direction being opposite the first direction;

continuously generating the electronic focus signal during movement of the target through the second distance;

comparing the absolute value of the magnitude of the electronic focus signal to the threshold value during movement of the target through the second distance; and stopping the movement of the target a second time when the absolute value of the magnitude of the electronic focus signal exceeds the threshold value.

11. The method of claim 10, wherein the target is moved through the first distance at a first velocity and through the second distance at a second velocity, the second velocity being less than the first velocity.

12. The method of claim 11, wherein the first velocity is a velocity between 1000 to 3000 microns per second.

13. The method of claim 11, wherein the second velocity is a velocity between 200 to 1400 microns per second.

14. A method for automatically focusing a microscope, comprising the steps of:

moving a target relative to a lens of the microscope, the target being moved to each of a first plurality of locations;

generating an electronic focus signal at each of the first plurality of locations, the magnitude of the electronic focus signal being a function of the magnitude of light reflected from a surface of the target through an optical path of the microscope;

after generating a first electronic focus signal, storing the magnitude of the absolute value of the first electronic focus signal as the maximum electronic focus signal;

for each subsequent electronic focus signal, comparing the magnitude of the absolute value of the electronic focus signal to the maximum electronic focus signal;

for each step of comparing, storing the greater of the magnitude of the absolute value of the subsequent electronic focus signal and the maximum electronic focus signal as an updated maximum electronic focus signal;

defining a location of the target corresponding to the updated maximum electronic focus signal as the estimated focus position.

15. The method of claim 14, further comprising the steps of:

moving the target relative to the lens in a first direction a predetermined distance away from the estimated focus position;

moving the target relative to the lens in a second direction opposite to the first direction, wherein:

the target is moved to each of a second plurality of locations; and the target is moved a distance greater than the predetermined distance;

generating the electronic focus signal at each of the second plurality of locations;

storing the magnitude of the absolute value of the electronic focus signal at a first one of the second plurality of locations as the maximum electronic focus signal;

for each subsequent electronic focus signal, comparing the magnitude of the absolute value of the subsequent electronic focus signal to the maximum electronic focus signal;

when the magnitude of the absolute value of the subsequent electronic focus signal is less than the maximum electronic focus signal, defining a location of the target corresponding to the subsequent electronic focus signal as the focus position.

16. A control circuit for stopping movement of a target of a confocal microscope during an auto-focus operation, comprising:

a comparator having a first input terminal coupled to receive an electronic focus voltage and a second input terminal coupled to receive a threshold voltage, the electronic focus voltage having an absolute value less than the threshold voltage when the microscope is in a non-focused condition, the electronic focus voltage having an absolute value greater than the threshold voltage when the microscope is in a focused condition;

a latch coupled to an output terminal of the comparator, wherein an output signal of the comparator trips the latch when the absolute value of the electronic focus voltage exceeds the threshold voltage; and a controller coupled to the latch, the controller stopping the movement of the target when the latch is tripped.

17. The circuit of claim 16, wherein the latch further comprises a reset terminal coupled to the controller, the latch being reset by a signal provided to the reset terminal.

18. The control circuit of claim 16, wherein said latch is a flip flop.

19. The circuit of claim 18, wherein the output terminal of the comparator is coupled to a set input terminal of the flip flop.

20. A method for positioning a target close to a focus position in a confocal microscope, said focus position being indicated by a peak of a focus signal, said focus signal having a width which indicates a focus condition, said method comprising the steps of:

positioning said target such that said focus position is within a range of motion of said target;

moving said target a plurality of first steps through said range of motion of said target, each of said first steps having a first width;

measuring a strength of said focus signal at each of said first steps;

determining a peak first step from said first steps, wherein said peak first step is the first step at which a maximum strength is measured;

moving said target a multiplicity of second steps through a second range of motion, wherein said second range of motion includes second steps above and below said peak first step, each of said multiplicity of steps having a second width;

measuring a strength of said focus signal at each of said multiplicity of second steps;

determining a peak second step from said second steps, wherein said peak second step is the second step at which a maximum strength is measured; and moving said target to said peak second step.

21. The method of claim 20, wherein said width of said focus signal is greater than said first width.

22. The method of claim 20, wherein said second range of motion is shorter than said first range of motion.

23. The method of claim 22, wherein said second width is shorter than said first width.

* * * * *

UNITED STATES PATENT AND TRADEMARK OFFICE
CERTIFICATE OF CORRECTION

PATENT NO. : 5,483,055
DATED : January 9, 1996
INVENTOR(S) : Timothy V. Thompson, Christopher R. Fairley and Ken K. Lee It is certified that error appears in the above-indentified patent and that said Letters Patent is hereby corrected as shown below:

Change the name of inventor "Christopher R. Fairlay" on the Title page of the patent as follows:

--Christopher R. Fairley--.

Signed and Sealed this

Fifteenth Day of April, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,483,055
DATED : January 9, 1996
INVENTOR(S) : Timothy V. Thompson, Christopher R. Fairley and Ken K. Lee It is certified that error appears in the above-identified patent and that said Letters Patent is hereby corrected as shown below:

On the Title page, item [76] Inventor "Christopher R. Fairlay" should read --Christopher R. Fairley--.

Signed and Sealed this

Seventeenth Day of March, 1998

Attest:

BRUCE LEHMAN

*Attesting Officer*  *Commissioner of Patents and Trademarks*